United States Patent
Niu et al.

(10) Patent No.: US 11,784,362 B2
(45) Date of Patent: Oct. 10, 2023

(54) POWER SUPPLY SYSTEM, CONTROL METHOD OF POWER SUPPLY SYSTEM AND CONTROL DEVICE OF POWER SUPPLY SYSTEM

(71) Applicants: CALB Co., Ltd., Jiangsu (CN); CALB Technology Co., Ltd., Jiangsu (CN)

(72) Inventors: Li Niu, Luoyang (CN); Xinjian Li, Changzhou (CN); Qixin Guo, Luoyang (CN); Xuan Zhang, Zhangzhou (CN); Zhouli Li, Luoyang (CN); Guohua Sun, Luoyang (CN); Yuefeng Li, Luoyang (CN)

(73) Assignees: CALB Co., Ltd., Jiangsu (CN); CALB Technology Co., Ltd., Jiangsu (CN)

( * ) Notice: Subject to any disclaimer, the term of this patent is extended or adjusted under 35 U.S.C. 154(b) by 259 days.

(21) Appl. No.: 17/371,125

(22) Filed: Jul. 9, 2021

(65) Prior Publication Data
US 2022/0367931 A1    Nov. 17, 2022

(30) Foreign Application Priority Data

May 14, 2021    (CN) .......................... 202110530011.0

(51) Int. Cl.
*H01M 10/63*    (2014.01)
*H01M 10/613*    (2014.01)
(Continued)

(52) U.S. Cl.
CPC ......... *H01M 10/63* (2015.04); *H01M 10/613* (2015.04); *H01M 10/625* (2015.04); *H01M 10/6567* (2015.04); *H01M 2220/20* (2013.01)

(58) Field of Classification Search
CPC .. H01M 10/63; H01M 10/613; H01M 10/625; H01M 10/6567; H01M 2220/20;
(Continued)

(56) References Cited

U.S. PATENT DOCUMENTS 6,114,833 A * 9/2000 Langston ................ B60L 58/15
                                                      320/109
10,350,960 B1 * 7/2019 Long ..................... H01M 10/663
(Continued)

FOREIGN PATENT DOCUMENTS

CN    107482139 A  * 12/2017  .......... H01M 10/613
CN    108515875     9/2018
(Continued)

OTHER PUBLICATIONS

Office Action of China Counterpart Application, with English translation thereof, dated Dec. 30, 2022, pp. 1-23.
(Continued)

*Primary Examiner* — Kaity V Chandler
(74) *Attorney, Agent, or Firm* — JCIP GLOBAL INC.

(57) ABSTRACT

A power supply system and a control method and control device thereof are provided. The power supply system includes a first power supply device, a heat-dissipation unit, a second power supply device, and a control device. The control device is configured to confirm whether each battery pack in the first power supply device experiences thermal runaway, and control the first power supply device to supply power to the heat-dissipation unit when no battery pack in the first power supply device experiences thermal runaway, so that the heat-dissipation unit dissipates heat from the first power supply device; and control a battery pack not experiencing thermal runaway in the first power supply device and/or the second power supply device to supply power to the heat-dissipation unit when a battery pack in the first power supply device experiences thermal runaway, so that the heat-dissipation unit dissipates heat from the first power supply device.

19 Claims, 8 Drawing Sheets

(51) Int. Cl.
*H01M 10/625* (2014.01)
*H01M 10/6567* (2014.01)

(58) Field of Classification Search
CPC ............... H01M 10/663; B60L 3/0092; B60L 2240/545; B60L 58/20; B60L 58/26; B60L 1/02; Y02T 10/70; Y02E 60/10; H02J 7/0013; H02J 7/00309; H02J 7/0063

See application file for complete search history.

(56) References Cited

U.S. PATENT DOCUMENTS

| | | | |
|---|---|---|---|
| 2016/0052421 A1* | 2/2016 | Galamb | B60L 53/302 165/47 |
| 2017/0088007 A1* | 3/2017 | Melendez | B60L 53/302 |
| 2017/0232865 A1* | 8/2017 | Christen | B60H 1/00278 429/120 |
| 2019/0217721 A1* | 7/2019 | Marcicki | H01M 10/613 |
| 2020/0339010 A1 | 10/2020 | Villanueva et al. | |
| 2021/0234209 A1* | 7/2021 | Wang | B60L 3/04 |

FOREIGN PATENT DOCUMENTS

| | | | | |
|---|---|---|---|---|
| CN | 108550950 | | 9/2018 | |
| CN | 108638822 A | * | 10/2018 | ............... B60K 1/04 |
| CN | 109244600 A | * | 1/2019 | .......... H01M 10/613 |
| CN | 109428013 A | * | 3/2019 | .......... H01M 10/613 |
| CN | 111430840 | | 7/2020 | |
| CN | 112510289 | | 3/2021 | |
| CN | 112531232 A | * | 3/2021 | .......... H01M 10/613 |
| CN | 112721572 A | * | 4/2021 | ......... B60H 1/00385 |
| CN | 112751104 | | 5/2021 | |
| CN | 113094921 A | * | 7/2021 | ............. G06F 30/20 |
| CN | 113097599 A | * | 7/2021 | .......... H01M 10/613 |

OTHER PUBLICATIONS

"Search Report of Counterpart Europe Application No. 21185477.3", dated May 2, 2022, p. 1-p. 11.

Office Action of China Counterpart Application, with English translation thereof, dated Jul. 27, 2022, pp. 1-24.

"Decision of Refusal of China Counterpart Application", dated Mar. 27, 2023, with English translation thereof, p. 1-p. 23.

* cited by examiner

POWER SUPPLY SYSTEM, CONTROL METHOD OF POWER SUPPLY SYSTEM AND CONTROL DEVICE OF POWER SUPPLY SYSTEM

CROSS-REFERENCE TO RELATED APPLICATION

This application claims the priority benefit of China application serial no. 202110530011.0, filed on May 14, 2021. The entirety of the above-mentioned patent application is hereby incorporated by reference herein and made a part of this specification.

BACKGROUND

Technical Field

The disclosure relates to the technical field of batteries, and in particular to a power supply system and a control method and a control device of the power supply system.

Description of Related Art

With the continuous improvement of battery capacity, specific energy, and fast charging capacity in the battery field, people continue to challenge the limits of materials and the design limits of batteries, which causes the safety of batteries to become an important technical challenge to be solved urgently.

One of the factors that cause batteries to be unsafe is thermal runaway. When a certain battery module in a battery pack experiences thermal runaway, one measure is to dissipate heat from the battery pack through a liquid-cooling system, so that the large amount of heat released by thermal runaway of the battery is taken away by a liquid coolant before triggering thermal runaway of adjacent batteries. However, the battery pack that has experienced thermal runaway powering the liquid-cooling system may easily cause more serious safety issues, such as fire, explosion, and other safety accidents.

SUMMARY

In a first aspect, an embodiment of the disclosure provides a power supply system, which includes the following.

A first power supply device includes one or more battery packs.

A heat-dissipation unit is configured to dissipate heat from the first power supply device.

A second power supply device.

A control device is configured to confirm whether each battery pack in the first power supply device experiences thermal runaway. When no battery pack in the first power supply device experiences thermal runaway, the first power supply device is controlled to supply power to the heat-dissipation unit, so that the heat-dissipation unit dissipates heat from the first power supply device. When a battery pack in the first power supply device experiences thermal runaway, a battery pack not experiencing thermal runaway in the first power supply device and/or the second power supply device are controlled to supply power to the heat-dissipation unit, so that the heat-dissipation unit dissipates heat from the first power supply device.

In a second aspect, an embodiment of the disclosure provides a control method of a power supply system. The power supply system includes a first power supply device, a heat-dissipation unit, and a second power supply device. The first power supply device includes one or more battery packs. The heat-dissipation unit is configured to dissipate heat from the first power supply device. The control method includes the following steps.

Whether each battery pack in the first power supply device experiences thermal runaway is confirmed.

The first power supply device is controlled to supply power to the heat-dissipation unit when no battery pack in the first power supply device experiences thermal runaway, so that the heat-dissipation unit dissipates heat from the first power supply device.

A battery pack not experiencing thermal runaway in the first power supply device and/or the second power supply device are controlled to supply power to the heat-dissipation unit when a battery pack in the first power supply device experiences thermal runaway, so that the heat-dissipation unit dissipates heat from the first power supply device.

In a third aspect, an embodiment of the disclosure provides a control device of a power supply system. The power supply system includes a first power supply device, a heat-dissipation unit, and a second power supply device. The first power supply device includes one or more battery packs. The heat-dissipation unit is configured to dissipate heat from the first power supply device. The control device includes the following.

A confirming unit is configured to confirm whether each battery pack in the first power supply device experiences thermal runaway.

A switching unit is configured to control the first power supply device to supply power to the heat-dissipation unit when no battery pack in the first power supply device experiences thermal runaway, so that the heat-dissipation unit dissipates heat from the first power supply device; and control a battery pack not experiencing thermal runaway in the first power supply device and/or the second power supply device to supply power to the heat-dissipation unit when a battery pack in the first power supply device experiences thermal runaway, so that the heat-dissipation unit dissipates heat from the first power supply device.

DETAILED DESCRIPTION OF DISCLOSED EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

The embodiment of the disclosure provides a power supply system and a control method and a control device of the power supply system, which are configured to solve safety issues when a battery pack experiences thermal runaway in the prior art.

Figure 1:
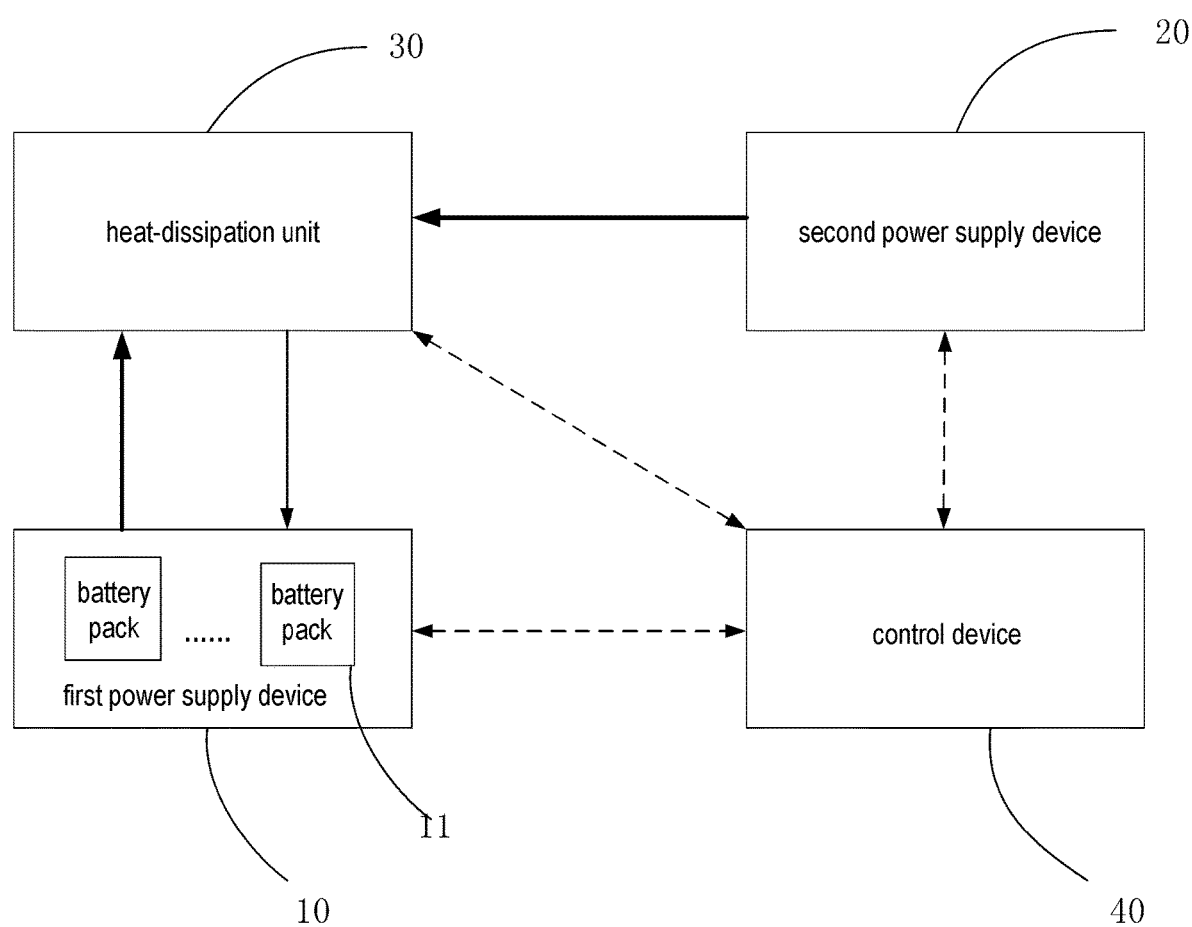
FIG. 1 is a schematic diagram of a structural composition of a power supply system according to an embodiment of the disclosure.

As shown in FIG. 1, the power supply system includes the following.

A first power supply device 10 includes one or more battery packs 11.

A heat-dissipation unit 30 is configured to dissipate heat from the first power supply device 10.

A second power supply device 20.

A control device 40 is configured to confirm whether each battery pack 11 in the first power supply device 10 experiences thermal runaway. When no battery pack 11 in the first power supply device 10 experiences thermal runaway, the first power supply device 10 is controlled to supply power to the heat-dissipation unit 30, so that the heat-dissipation unit 30 dissipates heat from the first power supply device 10. When the battery pack 11 in the first power supply device 10 experiences thermal runaway, the battery pack 11 not experiencing thermal runaway in the first power supply device 10 and/or the second power supply device 20 are controlled to supply power to the heat-dissipation unit 30, so that the heat-dissipation unit 30 dissipates heat from the first power supply device 10.

Figure 2:
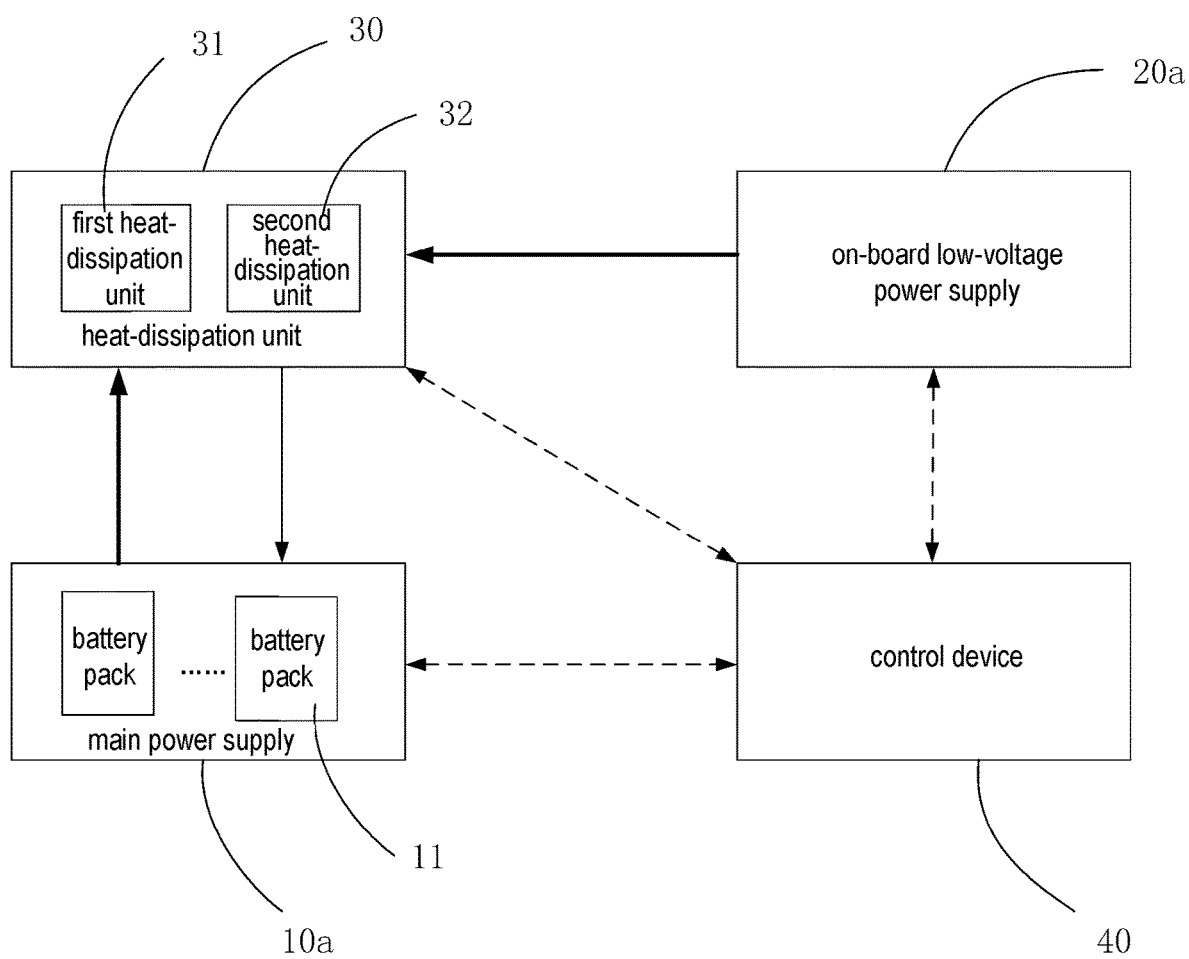
FIG. 2 is a schematic diagram of a structural composition of another power supply system according to an embodiment of the disclosure.
Figure 3:
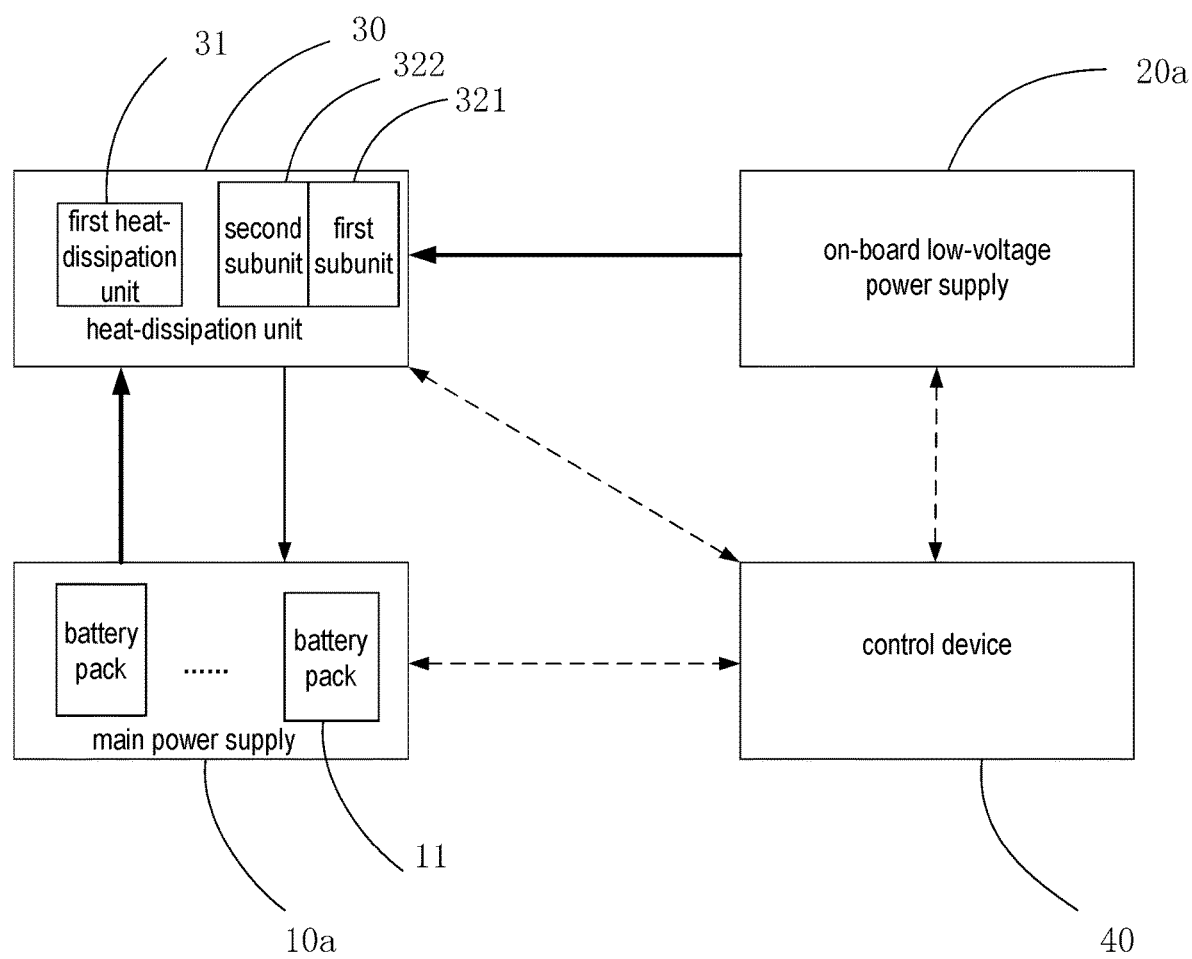
FIG. 3 is a schematic diagram of a structural composition of yet another power supply system according to an embodiment of the disclosure.

It is worth noting that in FIG. 1, the thick solid lines with arrows indicate that the first power supply device 10 and the second power supply device 20 may supply power to the heat-dissipation unit 30, the thin solid line with arrow indicates that the heat-dissipation unit 30 may dissipate heat from the first power supply device 10, and the dashed lines with double-headed arrows indicate that there is information interaction between the control device 40 and the first power supply device 10, the second power supply device 20, and the heat-dissipation unit 30. The meanings of the arrows and line types shown in FIG. 2 and FIG. 3 are the same as those in FIG. 1, and the description will not be repeated below.

The power supply system may be applied to vehicles and may also be applied to other electrical equipment.

Specifically, the first power supply device 10 may include one battery pack 11 or may include multiple battery packs 11, for example, two, three, four, etc., and the specific number is not limited.

Generally speaking, the battery pack 11 includes multiple battery modules. Multiple refers to at least two. The battery module includes multiple single batteries. The battery module may be adopted as a unit to divide the battery pack 11 into multiple unit modules. Each unit module includes one or more battery modules. Alternatively, the single battery may also be adopted as a unit to divide the battery pack 11 into multiple unit modules. Each unit module includes one or more single batteries. When judging whether the battery pack 11 experiences thermal runaway, it is necessary to perform thermal runaway monitoring on each unit module. If at least one unit module experiences thermal runaway, it is considered that the battery pack 11 experiences thermal runaway.

Each battery pack 11 is provided with a thermal runaway detection device. The thermal runaway detection device obtains battery thermal runaway feature data to be sent to a battery management system. The battery management system judges whether the battery pack 11 experiences thermal runaway according to the battery thermal runaway feature data, and sends a result about whether the battery 11 experiences thermal runaway to the control device. The battery thermal runaway data includes, but is not limited to, a voltage parameter and a temperature parameter of the single battery.

If the control device 40 confirms that no battery pack 11 in the first power supply device 10 experiences thermal runaway, the first power supply device 10 is controlled to supply power to the heat-dissipation unit 30. The heat-dissipation unit 30 includes high-voltage electrical components and low-voltage electrical components. The high-voltage electrical components include some high-power refrigeration components, such as a compressor. High-voltage power output by the first power supply device 10 may directly supply power to the high-voltage electrical components. The low-voltage electrical components include a water pump, etc. for driving the flow of a coolant. High-voltage power output by the first power supply device 10 may be first transformed into low-voltage power via a transformer, and then configured to supply power to the low-voltage electrical components such as the water pump. Alternatively, high-voltage power output by the first power supply device 10 is transformed into low-voltage power via a DC-DC control unit to charge an on-board storage battery.

The on-board storage battery is discharged to supply power to the low-voltage electrical components such as the water pump.

If the control device 40 confirms that the battery pack 11 in the first power supply device 10 experiences thermal runaway, the battery pack 11 not experiencing thermal runaway in the first power supply device 10 and/or the second power supply device 20 are adopted to supply power to the heat-dissipation unit 30. The second power supply device 20 is another supply device different from the first power supply device 10. In this way, on the one hand, the large amount of heat released by the unit module experiencing thermal runaway in the battery pack 11 is taken away by the heat-dissipation unit 30 before reaching an energy threshold that triggers thermal runaway of adjacent unit modules to avoid the spread of thermal runaway. On the other hand, after the battery pack 11 experiences thermal runaway, since the battery pack 11 no longer continues to supply power to the heat-dissipation unit 30, safety hazards caused by the battery pack 11 in a thermal runaway state continuing to supply power to the heat-dissipation unit 30 may be avoided, which effectively prevents the thermal runaway state from further deterioration.

Power supply circuits are respectively provided between the first power supply device 10 and the second power supply device 20 and the heat-dissipation unit 30. Through controlling the connection and disconnection of the power supply circuit, the first power supply device 10 may supply power to the heat-dissipation unit 30 when each battery pack 11 does not experience thermal runaway, and the second power supply device 20 does not supply power; and after one of the battery packs 11 experiences thermal runaway, the power supply circuit between the one of the battery packs 11 and the heat-dissipation unit 30 is disconnected, the power supply circuit between the battery pack 11 not experiencing thermal runaway and the heat-dissipation unit 30 remains connected, the battery pack 11 not experiencing thermal runaway is adopted to supply power to the heat-dissipation unit 30, and/or the power supply circuit between the second power supply device 20 and the heat-dissipation unit 30 is connected, so that the second power supply device 20 supplies power to the heat-dissipation unit 30.

The heat dissipation form of the battery pack 11 may be an air-cooling form, a liquid-cooling form, or a form of injecting refrigerant to the battery pack 11 for heat dissipation. During specific implementation, the heat-dissipation unit 30 may be a heat-dissipation unit adopting one of the heat dissipation forms to dissipate heat from the battery pack 11. For example, the heat-dissipation unit 30 is a heat-dissipation unit adopting the air-cooling form to dissipate heat from the battery pack 11. Specifically, the heat-dissipation unit 30 is an air-conditioning device. The air-conditioning device dissipates heat from the battery pack 11 through providing low-temperature airflow. Alternatively, the heat-dissipation unit 30 is one or more fans. The fans accelerate airflow, thereby dissipating heat from the battery pack 11.

For another example, the heat-dissipation unit 30 may also be a heat-dissipation unit adopting the liquid-cooling form to dissipate heat from the battery pack 11. Specifically, the heat-dissipation unit 30 includes a liquid-cooling circuit formed by a liquid-cooling plate, a heat exchanger, a pipeline, etc. A coolant exchanges heat with the battery pack 11 when flowing through the liquid-cooling plate, thereby dissipating heat from the battery pack 11. After absorbing heat, the coolant exchanges heat with air in the heat exchanger and flows back to the battery pack 11 to form one circulation.

For another example, the heat-dissipation unit 30 may also be a heat-dissipation unit that can inject refrigerant to the battery pack 11 to dissipate heat from the battery pack 11.

Other than the heat-dissipation unit adopting any of the heat dissipation forms above to dissipate heat from the battery pack 11, the heat-dissipation unit 30 may also be a heat-dissipation unit adopting a combination of several heat dissipation forms to dissipate heat from the battery pack 11. For example, the heat-dissipation unit 30 is a heat-dissipation unit adopting the air-cooling and liquid-cooling forms to dissipate heat from the battery pack 11. Specifically, the heat-dissipation unit 30 includes a fan and a liquid-cooling circuit formed by a liquid-cooling plate, a heat exchanger, a pipeline, etc. During usage, according to the heat generated by the battery pack 11, air-cooling and liquid-cooling may be independently used to dissipate heat from the battery pack 11 or air-cooling and liquid-cooling may be simultaneously used to dissipate heat from the battery pack 11.

It is worth noting that the heat dissipation form and specific composition adopted by the heat-dissipation unit 30 are not limited to the above.

In some embodiments, the power supply system is applied to a vehicle.

The first power supply device 10 is a main power supply 10a of the vehicle.

The second power supply device 20 is another power supply other than the main power supply 10a of the vehicle.

For example, the second power supply device 20 may be an auxiliary power supply device of the vehicle or the second power supply device 20 may be an on-board low-voltage power supply 20a.

In some embodiments, as shown in FIG. 2, the second power supply device 20 is the on-board low-voltage power supply 20a. For example, the on-board low-voltage power supply 20a is a 12V/24V power supply. If the control device 40 confirms that the battery pack 11 in the main power supply 10a experiences thermal runaway, the battery pack 11 not experiencing thermal runaway in the main power supply 10a and/or the on-board low-voltage power supply 20a are adopted to supply power to the heat-dissipation unit 30.

The on-board low-voltage power supply 20a is configured to provide low-voltage power and mainly supply power to the low-voltage electrical components disposed on the vehicle, such as an on-board display, a vehicle light, various meters, a control instrument, and a detection instrument. When the battery pack 11 in the first power supply device 10 experiences thermal runaway, the on-board low-voltage power supply 20a may be adopted to supply power to the heat-dissipation unit 30, so that the heat-dissipation unit 30 can continue to dissipate heat from the battery pack 11 of the first power supply device 10 to avoid further deterioration of thermal runaway.

Continuing to refer to FIG. 2, the heat-dissipation unit 30 includes a first heat-dissipation unit 31 and a second heat-dissipation unit 32.

The control device 40 is configured to control the first power supply device 10 to supply power to the heat-dissipation unit 30 when no battery pack 11 in the first power supply device 10 experiences thermal runaway, so that the heat-dissipation unit 30 dissipates heat from the first power supply device 10.

Specifically, the control device 40 is configured to control the main power supply 10a to supply power to the first heat-dissipation unit 31 when no battery pack 11 in the main power supply 10a experiences thermal runaway, so that the first heat-dissipation unit 31 refrigerates to dissipate heat from the main power supply 10a.

The control device 40 is configured to control the battery pack 11 not experiencing thermal runaway in the first power supply device 10 and/or the second power supply device 20 to supply power to the heat-dissipation unit 30 when the battery pack 11 in the first power supply device 10 experiences thermal runaway, so that the heat-dissipation unit 30 dissipates heat from the first power supply device 10.

Specifically, the control device 40 is configured to control the on-board low-voltage power supply 20a to supply power to the second heat-dissipation unit 32 when the battery pack 11 in the main power supply 10a experiences thermal runaway, so that the second heat-dissipation unit 32 dissipates heat from the main power supply 10a.

The heat-dissipation unit 30 includes the first heat-dissipation unit 31 adapted to the power supply capacity of the main power supply 10a when the main power supply 10a serves as the power supply. The heat-dissipation unit 30 further includes the second heat-dissipation unit 32 adapted to the power supply capacity of the on-board low-voltage power supply 20a the first heat-dissipation unit 31 when the on-board low-voltage power supply 20a serves as the power supply. After the battery pack 11 in the main power supply 10a experiences thermal runaway, the on-board low-voltage power supply 20a may be used to supply power to the second heat-dissipation unit 32, thereby continuing to dissipate heat from the battery pack 11 in the main power supply 10a. On the one hand, the large amount of heat released by the unit module experiencing thermal runaway in the battery pack 11 is taken away by the heat-dissipation unit 30 before reaching the energy threshold triggering thermal runaway of adjacent unit modules to avoid the spread of thermal runaway. On the other hand, after the battery pack 11 experiences thermal runaway, since the battery pack 11 no longer continues to supply power to the heat-dissipation unit 30, safety hazards caused by the battery pack 11 in the thermal runaway state continuing to supply power to the heat-dissipation unit 30 may be avoided, which effectively prevents the thermal runaway state from further deterioration.

The first heat-dissipation unit 31 may be a heat-dissipation unit adopting the liquid-cooling form to dissipate heat from the battery pack 11. Heat is taken away from the battery pack 11 through the flow of a coolant, thereby serving the cooling function. Since the first heat-dissipation unit 31 is powered by the main power supply 10a when working, the first heat-dissipation unit 31 dissipates heat from the main power supply 10a through the continuous circulation of the coolant on the one hand, and on the other hand, a form of mechanical refrigeration may also be adopted to cool down the coolant with increased temperature due to absorption of heat, so as to achieve a good refrigeration effect. Correspondingly, electrical energy output by the main power supply 10a is configured to supply power to a water pump, thereby driving the circulation of the coolant in a pipeline. At the same time, the electrical energy is also configured to supply power to the high-voltage electrical components in mechanical refrigeration, such as a compressor.

The second heat-dissipation unit 32 may also be a heat-dissipation unit adopting the liquid-cooling form to dissipate heat from the battery pack 11. Heat of the battery pack 11 is taken away through the flow of a coolant, thereby serving the cooling function. Since the second heat-dissipation unit 32 is powered by the on-board low-voltage power supply 20a when working, the second heat-dissipation unit 32 dissipates heat from the battery pack 11 through the continuous circulation of the coolant. At the same time, a natural cooling source is adopted to cool down the coolant with increased temperature due to absorption of heat. Specifically, air in the environment is used as the cooling source. The coolant with increased temperature due to absorption of heat exchanges heat with the air in the heat exchanger. After the temperature is reduced, the coolant may continue to dissipate heat from the battery pack 11. Further, in order to improve the heat dissipation effect of the battery pack 11, a fan may be adopted to accelerate airflow. Correspondingly, electrical energy output by the on-board low-voltage power supply 20a is configured to supply power to a water pump, thereby driving the circulation of the coolant in a pipeline. The electrical energy may also be configured to supply power to the fan to rotate the fan to accelerate airflow, so as to improve the heat exchange effect of the air and the coolant.

The first heat-dissipation unit 31 and the second heat-dissipation unit 32 may also be in other forms and are not limited to the above forms of the heat-dissipation units.

From the perspective of system composition, the first heat-dissipation unit 31 includes the high-voltage electrical components, such as a compressor. Since the components need to operate under high-voltage electricity, the first heat-dissipation unit 31 needs to adopt the main power supply 10a to supply power when being used. In other words, when no battery pack 11 in the main power supply 10a experiences thermal runaway, the main power supply 10a may be adopted to supply power to the first heat-dissipation unit 31, and the first heat-dissipation unit 31 may be activated to dissipate heat from the battery pack 11 in the main power supply 10a. Once the battery pack 11 in the main power supply 10a experiences thermal runaway, the power supply circuit between the main power supply 10a and the first heat-dissipation unit 31 will be disconnected, and the first heat-dissipation unit 31 will not continue to dissipate heat from the battery pack 11 in the main power supply 10a.

The second heat-dissipation unit 32 includes the low-voltage electrical components, such as a water pump 303 and an air-cooling radiator 305. The components need to operate under low-voltage electricity. When the battery pack 11 in the main power supply 10a experiences thermal runaway, the power supply circuit between the on-board low-voltage power supply 20a and the second heat-dissipation unit 32 is connected, the on-board low-voltage power supply 20a is controlled to supply power to the second heat-dissipation unit 30, and the second heat-dissipation unit 32 is activated to dissipate heat from the battery pack 11 in the main power supply 10a.

In some embodiments, the power supply system further includes a first thermal runaway detection device. The first thermal runaway detection device is configured to detect multiple indicators reflecting the degree of thermal runaway of the battery pack 11, and send numerical values of the indicators reflecting the degree of thermal runaway of the battery pack 11 to the control device 40.

As shown in FIG. 3, the second heat-dissipation unit 32 includes a first subunit 321 and a second subunit 322. The heat dissipation effect of the first subunit 321 is lower than the heat dissipation effect of the second subunit 322.

The control device 40 is configured to control the on-board low-voltage power supply 20a to supply power to the second heat-dissipation unit 32 when the battery pack 11 in the main power supply 10a experiences thermal runaway, so that the second heat-dissipation unit 32 dissipates heat from the main power supply 10a.

Specifically, the control device 40 obtains the numerical values of the indicators reflecting the degree of thermal runaway of the battery pack 11.

The control device 40 controls the on-board low-voltage power supply 20a to supply power to the first subunit 321 when the numerical values of the obtained indicators satisfy a preset condition, so that the first subunit 321 dissipates heat from the main power supply 10a.

The control device 40 controls the on-board low-voltage power supply 20a to supply power to the second subunit 322 when the numerical values of the obtained indicators do not satisfy the preset condition, so that the second subunit 322 dissipates heat from the main power supply 10a.

From the perspective of heat dissipation effect, the heat dissipation effect of the first subunit 321 is lower than the heat dissipation effect of the second subunit 322.

From the perspective of heat dissipation form, the first subunit 321 and the second subunit 322 may both be heat-dissipation units adopting one of the heat dissipation forms of air cooling, liquid cooling, directly injecting refrigerant, etc., to dissipate heat from the battery pack 11 or may be heat-dissipation units adopting a combination of several heat-dissipation forms to dissipate heat from the battery pack 11.

Specifically, for example, the first subunit 321 is an air-cooling heat-dissipation unit formed by one or more sets of fans. During the rotation of the fans, airflow around the battery pack 11 is accelerated to dissipate heat. The second subunit 322 is a liquid-cooling heat-dissipation unit composed of a liquid-cooling plate, a water pump, a pipeline, etc.

For another example, the first subunit 321 and the second subunit 322 are both liquid-cooling heat-dissipation units.

When the numerical values of the obtained indicators satisfy the preset condition, it means that the degree of thermal runaway of the battery pack 11 is still within the control range of the first subunit 321. At this time, an external power supply device is controlled to supply power to the electrical components in the first subunit 321, and the first subunit 321 is controlled to dissipate heat from the battery pack 11 until thermal runaway of the battery pack 11 is effectively suppressed.

When the numerical values of the obtained indicators do not satisfy the preset condition, it means that the degree of thermal runaway of the battery pack 11 has exceeded the control range of the first subunit 321. At this time, the on-board low-voltage power supply 20a is controlled to supply power to the electrical components in the second subunit 322, and the second subunit 322 is controlled to dissipate heat from the battery pack 11. Heat from the battery pack 11 is dissipated through the second subunit 322 with better heat dissipation effect, thereby suppressing further deterioration of thermal runaway of the battery pack 11.

In this way, different subunits are adopted to dissipate heat from the battery pack 11 according to the degree of thermal runaway of the battery pack 11. On the one hand, thermal runaway of the battery pack 11 may be effectively suppressed. On the other hand, the power of the on-board low-voltage power supply 20a may be effectively used.

During specific implementation, the higher the numerical values of the obtained indicators, the more serious the degree of thermal runaway of the battery pack. The indicators include but are not limited to the temperature of the battery pack, the number of unit modules experiencing thermal runaway, the air pressure in the battery pack, etc.

The "preset condition" may be set such that the numerical values of the obtained indicators are all less than a corresponding threshold.

Specifically, the control device 40 controls the on-board low-voltage power supply 20a to supply power to the first subunit 321 when the numerical values of the obtained indicators are all less than the threshold, so that the first subunit 321 dissipates heat from the main power supply 10a.

The control device 40 controls the on-board low-voltage power supply 20a to supply power to the second subunit 322 when the numerical value of at least one indicator is not less than the corresponding threshold, so that the second subunit 322 dissipates heat from the main power supply 10a.

In some embodiments, the control device 40 controls the on-board low-voltage power supply 20a to supply power to the first subunit 321 when the numerical values of the obtained indicators satisfy the preset condition, so that the first subunit 321 dissipates heat from the main power supply 10a.

Specifically, the control device 40 controls the on-board low-voltage power supply 20a to supply power to a first liquid-cooling circuit of the first subunit 321 when the numerical values of the obtained indicators satisfy the preset condition, so that a coolant dissipates heat from a main power battery via the first liquid-cooling circuit.

The control device 40 controls the on-board low-voltage power supply 20a to supply power to the second subunit 322 when the numerical values of the obtained indicators do not satisfy the preset condition, so that the second subunit 322 dissipates heat from the main power supply 10a.

Specifically, the control device 40 controls the on-board low-voltage power supply 20a to supply power to a second liquid-cooling circuit of the second subunit 322 when the numerical values of the obtained indicators do not satisfy the preset condition, so that a coolant dissipates heat from the main power battery via the second liquid-cooling circuit. The on-board low-voltage power supply 20a is controlled to supply power to an air-cooling radiator of the second subunit 322, so that the air-cooling radiator dissipates heat from the coolant in the second liquid-cooling circuit.

The first subunit 321 and the second subunit 322 are both liquid-cooling heat-dissipation units. The first subunit 321 and the second subunit 322 essentially dissipate heat from the battery pack 11 in the first power supply device 10 through the circulation of the coolant. The differences between the two are as follows.

After the coolant in the first subunit 321 absorbs heat of the battery pack 11 and the temperature increases, the cooling manner thereof is that the coolant exchanges heat with air in the heat exchanger to cool down.

After the coolant in the second subunit 322 absorbs heat of the battery pack 11 and the temperature increases, the cooling manner thereof is that the coolant not only exchanges heat with air in the heat exchanger, but also further exchanges heat with air when flowing through the air-cooling radiator, thereby achieving a better heat exchange effect. The air-cooling radiator is provided with a fan. The fan may accelerate airflow, thereby improving the heat exchange effect between the coolant and air.

Figure 4:
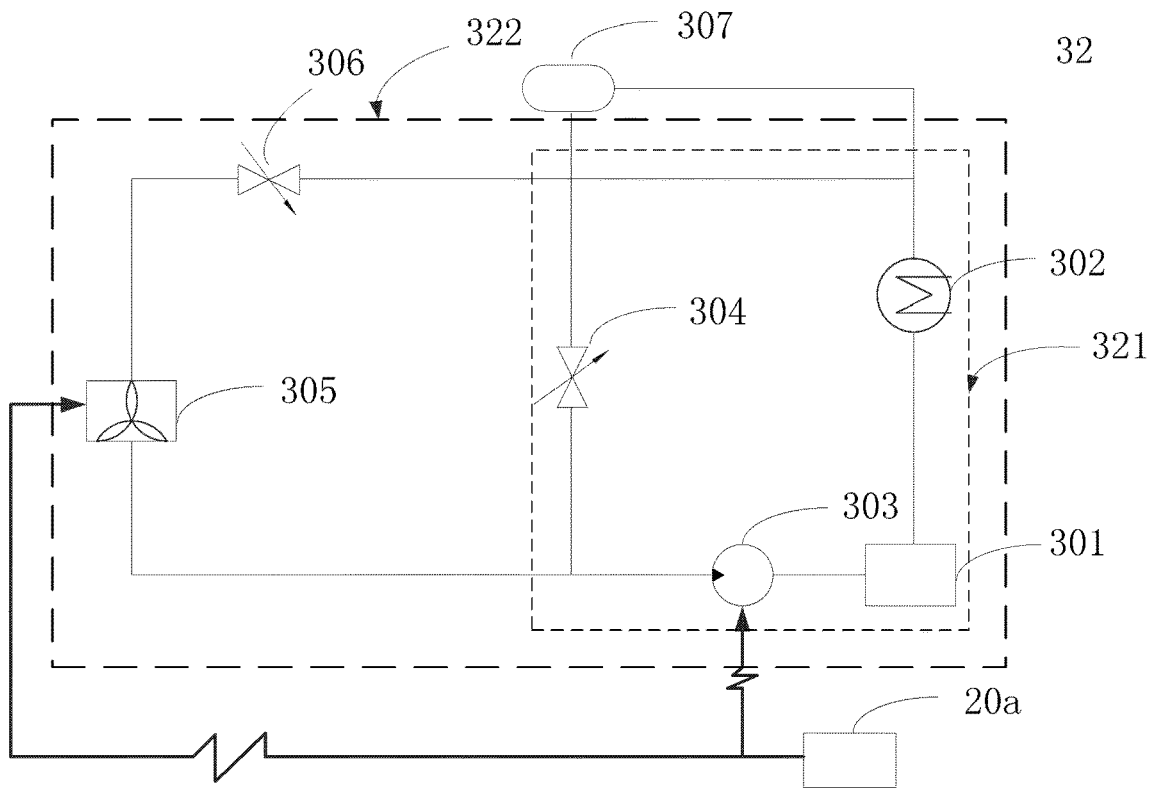
FIG. 4 is a schematic diagram of a second heat-dissipation unit according to an embodiment of the disclosure.

As shown in FIG. 4, the first liquid-cooling circuit in the first subunit 321 includes a main pipeline (not shown) and a first branch (not shown). The main pipeline is connected to the first branch. The main pipeline is provided with a liquid-cooling plate 301, a heat exchanger 302, and a water pump 303. The first branch is provided with a first control valve 304. When the first control valve 304 is opened, the first liquid-cooling circuit forms a closed circuit.

Specifically, the liquid-cooling plate 301 is located in the battery pack 11. A liquid-cooling channel is provided inside the liquid-cooling plate 301. The coolant exchanges heat with the battery pack 11 during the process of flowing through the liquid-cooling plate 301 to cool down the battery pack 11.

The heat exchanger 302 has a fin structure. The coolant exchanges heat with air in the heat exchanger 302, so that the temperature of the coolant is reduced.

The water pump 303 is configured to pump the coolant, so that the coolant flows in circulation in the first liquid-cooling circuit.

The first control valve 304 is disposed on the first branch. When the first control valve 304 is opened, the first liquid-cooling circuit forms a closed circuit. After the first control valve 304 is closed, the first liquid-cooling circuit is blocked.

Of course, in addition to the components above, the first subunit 321 further includes other components, such as a flow meter and a temperature sensor disposed on a pipe, which will not be listed one by one here.

If the battery pack 11 in the first power supply device 10 experiences thermal runaway, and the numerical values of the indicators reflecting the degree of thermal runaway of the battery pack 11 satisfy the preset condition, the on-board low-voltage power supply 20a is controlled to supply power to the water pump 303, and the first control valve 304 is controlled to be opened, so that the first liquid-cooling circuit forms a closed circuit. The coolant exchanges heat with the battery pack 11 during the process of flowing through the liquid-cooling plate 301 to cool down the battery pack 11. After flowing out of the liquid-cooling plate 301, the coolant enters the exchange exchanger 302. The coolant exchanges heat with air in the heat exchanger 302 to reduce the temperature, and returns to the liquid-cooling plate 301 along the pipeline under the driving action of the water pump 303, so as to implement one circulation and implement the objective of dissipating heat from the battery pack 11. Multiple refers to at least two.

Continuing to refer to FIG. 4, the second liquid-cooling circuit in the second subunit 322 and the first liquid-cooling circuit in the first subunit 321 share the main pipeline and the liquid-cooling plate 301, the heat exchanger 302, and the water pump 303 disposed on the main pipeline. The second subunit 322 further includes a second branch. The second branch is connected to the main pipeline. The second branch is provided with a second control valve 306 and an air-cooling radiator 305. When the second control valve 306 is opened, the second liquid-cooling circuit forms a closed circuit.

If the battery pack 11 experiences thermal runaway, and the numerical values of the indicators reflecting the degree of thermal runaway of the battery pack 11 do not satisfy the preset condition, the on-board low-voltage power supply 20a is controlled to supply power to the water pump 303 and the air-cooling radiator 305, the first control valve 304 is controlled to be closed, and the second control valve 306 is controlled to be opened, so that the second liquid-cooling circuit forms a closed circuit. The coolant returns to the liquid-cooling plate 301 after sequentially flowing through the liquid-cooling plate 301, the heat exchanger 302, the air-cooling radiator 305, and the water pump 303, so as to implement the objective of dissipating heat from the battery pack 11. Since the coolant further exchanges heat with air in the air-cooling radiator 305 after flowing through the heat exchanger 302, the temperature of the coolant is further reduced. Therefore, this part of the coolant may generate better heat dissipation effect after flowing back to the liquid-cooling plate 301.

As shown in FIG. 4, the circulation path of the coolant in the second liquid-cooling circuit is greater than the circulation path of the coolant in the first liquid-cooling circuit. The total amount of the coolant in the second liquid-cooling circuit is more than the total amount of the coolant in the first liquid-cooling circuit. The coolant in the second liquid-cooling circuit may fully exchange heat with air during the process of flowing. Thus, the heat-dissipation effect of the coolant on the battery pack via the second liquid-cooling circuit is better than the heat-dissipation effect of the coolant on the battery pack after passing through the first liquid-cooling circuit.

Further, an expansion water tank 307 is further included. The expansion water tank 307 is connected to the main pipeline. The expansion water tank 307 may remove air in the pipeline and prevent the water pump 303 from cavitation.

In addition, in the first subunit 321 and the second subunit 322, the first liquid-cooling circuit and the second liquid-cooling circuit may also be circuits formed by adopting the same pipeline. The circuit is provided with the liquid-cooling plate 301, the heat exchanger 302, the water pump. 303, the air-cooling radiator 305, and other components. When the degree of thermal runaway of the battery pack is lower, the remaining circuit modules thereof only supply power to the water pump 303, and heat is dissipated from the battery pack through the continuous circulation of the coolant. When the degree of thermal runaway is higher, the remaining circuit modules simultaneously supply power to the water pump 303 and the air-cooling radiator 305, so that the coolant is continuously circulated in the circuit, and the coolant further exchanges heat with air when flowing through the air-cooling radiator 305. In this way, the temperature is lower when the coolant enters the liquid-cooling plate 301 again, which enhances the heat dissipation effect of the battery pack.

In the above embodiments, the heat dissipation effect of the first subunit 321 is lower than the heat dissipation effect of the second subunit 322. If the battery pack 11 in the first power supply device 10 experiences thermal runaway, an alternative manner is adopted to select an appropriate subunit to dissipate heat from the battery pack 11 in the first power supply device 10 according to the degree of thermal runaway.

In addition to adopting the alternative manner to dissipate heat from the battery pack 11 in the first power supply device 10, heat may also be dissipated from the battery pack 11 in the first power supply device 10 by adopting a superimposing form. Specifically, the power supply system further includes the first thermal runaway detection device. The first thermal runaway detection device is configured to detect the indicators reflecting the degree of thermal runaway of the battery pack 11, and send the numerical values of the indicators reflecting the degree of thermal runaway of the battery pack 11 to the control device.

The second heat-dissipation unit 32 includes the first subunit 321 and the second subunit 322;

The control device 40 is configured to control the on-board low-voltage power supply 20a to supply power to the second heat-dissipation unit 32 when the battery pack 11 in the main power supply 10a experiences thermal runaway and control the second heat-dissipation unit 32 to dissipate heat from the main power supply 10a.

Specifically, the control device obtains the numerical values of the indicators reflecting the degree of thermal runaway of the battery pack 11.

The control device controls the on-board low-voltage power supply 20a to supply power to the first subunit 321 and controls the first subunit 321 to dissipate heat from the main power supply 10a when the numerical values of the obtained indicators satisfy the preset condition.

The control device controls the on-board low-voltage power supply 20a to supply power to the first subunit 321 and the second subunit 322 when the numerical values of the obtained indicators do not satisfy the preset condition, so that the first subunit 321 and the second subunit 322 dissipate heat from the main power supply 10a.

For example, the first subunit 321 is a liquid-cooling heat-dissipation unit 30. The liquid-cooling heat-dissipation unit 30 dissipates heat from the battery pack 11 through the circulation of the coolant. The second subunit 322 is an air-cooling heat-dissipation unit 30, which includes one or more sets of fans. The fans dissipate heat through blowing air to the battery pack 11.

When the degree of thermal runaway is lower, only the liquid-cooling heat-dissipation unit is adopted to dissipate heat from the battery pack 11. When the thermal runaway is higher, the liquid-cooling heat-dissipation unit and the air-cooling heat-dissipation unit are both adopted to dissipate heat from the battery pack 11.

As an example, the first subunit 321 and the second subunit 322 may both be liquid-cooling heat-dissipation units, etc., but not limited thereto.

In this way, when thermal runaway of the battery pack 11 is more severe, the heat dissipation effect is enhanced through the superposition of the two subunits, which may effectively prevent thermal runaway from further deterioration.

During specific implementation, the higher the numerical values of the obtained indicators, the more serious the degree of thermal runaway of the battery pack. The indicators include but are not limited to the temperature of the battery pack, the number of unit modules experiencing thermal runaway, the air pressure in the battery pack, etc. The "preset condition" may be set such that the numerical values of the obtained indicators are all less than the corresponding threshold.

Specifically, the control device 40 controls the on-board low-voltage power supply 20a to supply power to the first subunit 321 when the numerical values of the obtained indicators are less than the threshold, so that the first subunit 321 dissipates heat from the main power supply 10a.

The control device 40 controls the on-board low-voltage power supply 20a to supply power to the first subunit 321 and the second subunit 322 when the numerical value of at least one indicator is not less than the corresponding threshold, so that the first subunit 321 and the second subunit 322 dissipate heat from the main power supply 10a.

In other embodiments, the power supply system further includes the first thermal runaway detection device. The first thermal runaway detection device is configured to detect the indicators reflecting the degree of thermal runaway of the battery pack 11, and send the numerical values of the indicators reflecting the degree of thermal runaway of the battery pack 11 to the control device 40.

The second heat-dissipation unit 32 includes the heat exchanger and the first subunit 321 disposed on a hot side of the heat exchanger and the second subunit 322 disposed on a cold side of the heat exchanger.

The control device 40 is configured to control the on-board low-voltage power supply 20a to supply power to the second heat-dissipation unit 32 when the battery pack 11 in the main power supply 10a experiences thermal runaway, so that the second heat-dissipation unit 32 dissipates heat from the main power supply 10a.

Specifically, the control device 40 obtains the numerical values of the indicators reflecting the degree of thermal runaway of the battery pack 11.

The control device 40 controls the on-board low-voltage power supply 20a to supply power to the first liquid-cooling circuit of the first subunit 321 when the numerical values of the obtained indicators satisfy the preset condition, so that the first liquid-cooling circuit dissipates heat from the main power supply 10a.

The control device 40 controls the on-board low-voltage power supply 20a to supply power to the first liquid-cooling circuit of the first subunit 321 when the numerical values of the obtained indicators do not satisfy the preset condition, so that the first liquid-cooling circuit dissipates heat from the main power supply 10a. The control device 40 also controls the on-board low-voltage power supply 20a to supply power to the heat-dissipation circuit of the second subunit 322, so that a cooling medium in the heat-dissipation circuit exchanges heat with the coolant in the first liquid-cooling circuit in the heat exchanger.

Figure 5:
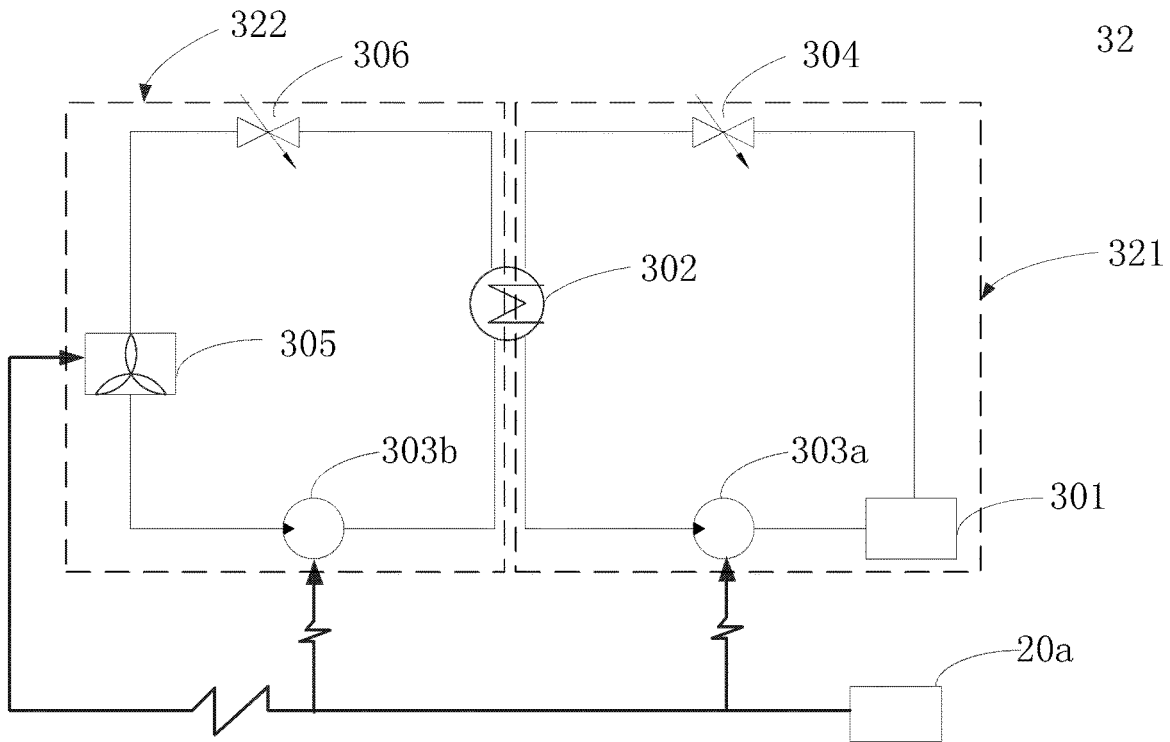
FIG. 5 is a schematic diagram of another second heat-dissipation unit according to an embodiment of the disclosure.

Specifically, as shown in FIG. 5, the first subunit 321 and the second subunit 322 are respectively disposed on the hot side and the cold side of the heat exchanger 302. The first subunit 321 includes the liquid-cooling plate 301, the first control valve 304, a first water pump 303a, and other components. The second subunit 322 mainly includes the air-cooling radiator 305, a second water pump 303b, the second control valve 306, and other components. The first subunit 321 specifically dissipates heat from the battery pack 11 through continuously circulating the coolant in the first liquid-cooling circuit. After the temperature of the coolant in the first subunit 321 increases, the coolant exchanges heat with the cooling medium in the second subunit 322 in the heat exchanger 302. A cooling source of the coolant in the second subunit 322 is a natural cooling source such as air.

The second subunit 322 may adopt the above form to dissipate heat from the coolant in the first liquid-cooling circuit, and may also use saltpeter refrigeration, etc. to dissipate heat from the coolant in the first liquid-cooling circuit.

During specific implementation, the higher the numerical values of the obtained indicators, the more serious the degree of thermal runaway of the battery pack. The indicators include but are not limited to the temperature of the battery pack, the number of unit modules experiencing thermal runaway, the air pressure in the battery pack, etc. The "preset condition" may be set such that the numerical values of the obtained indicators are all less than a corresponding threshold.

Specifically, the control device 40 controls the on-board low-voltage power supply 20a to supply power to the first subunit 321 when the numerical values of the obtained indicators are all less than the threshold, so that the first subunit 321 dissipates heat from the main power supply 10a.

The control device 40 controls the on-board low-voltage power supply 20a to supply power to the first liquid-cooling circuit of the first subunit 321 when the numerical value of at least one indicator is not less than the corresponding threshold, so that the first liquid-cooling circuit dissipates heat from the main power supply 10a. The control device 40 also controls the on-board low-voltage power supply 20a to supply power to the heat-dissipation circuit of the second subunit 322, so that the cooling medium in the heat-dissipation circuit exchanges heat with the coolant in the first liquid-cooling circuit in the heat exchanger.

In the power supply system, the indicators reflecting the degree of thermal runaway of the battery pack 11 include at least the temperature in the battery pack 11 and the number of unit modules experiencing thermal runaway in the battery pack 11. Each unit module includes at least one single battery.

The temperature in the battery pack 11 refers to the ambient temperature in the box of the battery pack 11. The higher the temperature of the battery pack 11, the more heat is released by the unit module experiencing thermal runaway. After a large amount of heat accumulates inside the battery pack 11, the energy threshold triggering thermal runaway of adjacent unit modules may be easily reached, thereby causing thermal runaway of other unit modules, and further spreading thermal runaway.

The battery pack 11 includes multiple unit modules. The greater the number of unit modules experiencing thermal runaway, the more heat is released, and the more easily it is to further cause thermal runaway of adjacent unit modules, thereby causing the degree of thermal runaway of the battery pack 11 to further deteriorate.

In addition to the temperature of the battery pack 11 and the number of unit modules experiencing thermal runaway in the battery pack 11, the indicators reflecting the degree of thermal runaway of the battery pack 11 may further include but are not limited to the air pressure in the battery pack 11, the concentration of smoke in the battery pack 11, the discharge amount of electrolyte, the degree of expansion of the battery, and other indicators.

Specifically, the first thermal runaway detection device specifically detects a temperature value in the battery pack 11 through the following manner.

The first thermal runaway detection device obtains temperature values at at least two different positions in the battery pack 11.

An average value of the at least two temperature values is used as the temperature value in the battery pack 11.

During specific implementation, multiple temperature collection devices may be disposed at different positions in the battery pack 11. Each temperature collection device is configured to collect the temperature at the corresponding position in the battery pack 11. The average value of the temperature values collected through the temperature collection devices is used as a physical quantity measuring the degree of thermal runaway of the battery pack 11, so that the accuracy is higher and errors caused by a single temperature collection device are avoided.

Figure 6:
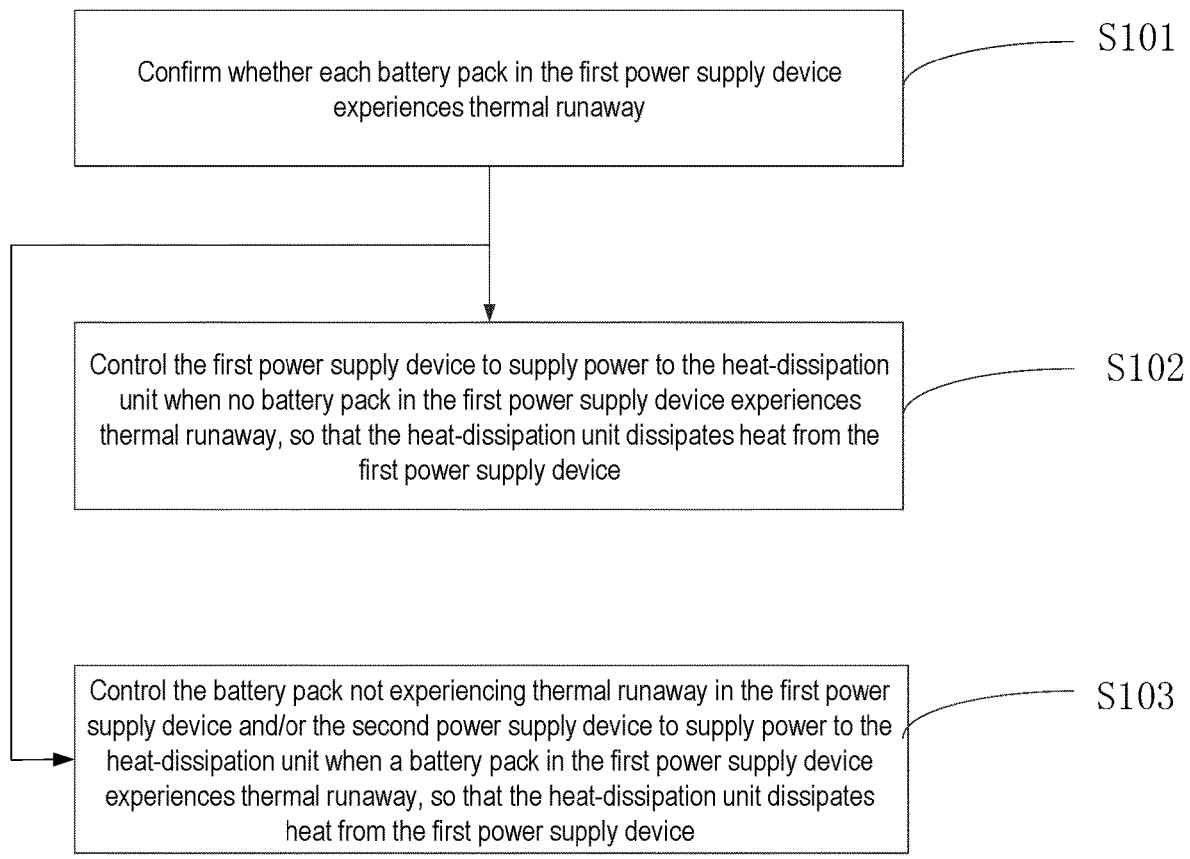
FIG. 6 is a basic flowchart of a control method according to an embodiment of the disclosure.

Based on the same inventive concept, an embodiment of the disclosure further provides a control method of a power supply system. The power supply system includes a first power supply device 10, a heat-dissipation unit 30, and a second power supply device 20. The first power supply device 10 includes one or more battery packs 11. The heat-dissipation unit 30 is configured to dissipate heat from the first power supply device 10. As shown in FIG. 6, the control method includes the following steps.

In step S101, confirm whether each battery pack 11 in the first power supply device 10 experiences thermal runaway.

In step S102, control the first power supply device 10 to supply power to the heat-dissipation unit 30 when no battery pack 11 in the first power supply device 10 experiences thermal runaway, so that the heat-dissipation unit 30 dissipates heat from the first power supply device 10.

In step S103, control the battery pack 11 not experiencing thermal runaway in the first power supply device 10 and/or the second power supply device 20 to supply power to the heat-dissipation unit 30 when the battery pack 11 in the first power supply device 10 experiences thermal runaway, so that the heat-dissipation unit 30 dissipates heat from the first power supply device 10.

In some embodiments, the power supply system is applied to a vehicle. The first power supply device 10 is a main power supply 10*a* of the vehicle. The second power supply device 20 is another power supply other than the main power supply 10*a* of the vehicle.

The first power supply device 10 is controlled to supply power to the heat-dissipation unit 30 when no battery pack 11 in the first power supply device 10 experiences thermal runaway, so that the heat-dissipation unit 30 dissipates heat from the first power supply device 10.

Specifically, the main power supply 10*a* is controlled to supply power to the heat-dissipation unit 30 when no battery pack 11 in the main power supply 10*a* experiences thermal runaway, so that the heat-dissipation unit 30 dissipates heat from the main power supply 10*a*.

The battery pack 11 not experiencing thermal runaway in the first power supply device 10 and/or the second power supply device 20 are controlled to supply power to the heat-dissipation unit 30 when the battery pack 11 in the first power supply device 10 experiences thermal runaway, so that the heat-dissipation unit 30 dissipates heat from the first power supply device 10.

Specifically, the battery pack 11 not experiencing thermal runaway in the main power supply 10*a* and/or another power supply other than the main power supply 10*a* are controlled to supply power to the heat-dissipation unit 30 when the battery pack 11 in the main power supply 10*a* experiences thermal runaway, so that the heat-dissipation unit 30 dissipates heat from the main power supply 10*a*.

The second power supply device 20 may be an auxiliary supply device of the vehicle or the second power supply device 20 may be an on-board low-voltage power supply 20*a*.

In some embodiments, another power supply other than the main power supply 10*a* of the vehicle is the on-board low-voltage power supply 20*a*.

The battery pack 11 not experiencing thermal runaway in the main power supply 10*a* and/or another power supply other than the main power supply 10*a* are controlled to supply power to the heat-dissipation unit 30 when the battery pack 11 in the main power supply 10*a* experiences thermal runaway, so that the heat-dissipation unit 30 dissipates heat from the main power supply 10*a*.

Specifically, the battery pack 11 not experiencing thermal runaway in the main power supply 10*a* and/or the on-board low-voltage power supply 20*a* are controlled to supply power to the heat-dissipation unit 30 when the battery pack 11 in the main power supply 10*a* experiences thermal runaway, so that the heat-dissipation unit 30 dissipates heat from the main power supply 10*a*.

Further, the heat-dissipation unit 30 includes a first heat-dissipation unit 31 and a second heat-dissipation unit 32.

The main power supply 10*a* is controlled to supply power to the heat-dissipation unit 30 when no battery pack 11 in the main power supply 10*a* experiences thermal runaway, so that the heat-dissipation unit 30 dissipates heat from the main power supply 10*a*.

Specifically, the main power supply 10*a* is controlled to supply power to the first heat-dissipation unit 31 when no battery pack 11 in the main power supply 10*a* experiences thermal runaway, so that the first heat-dissipation unit 31 is cooled down and heat is dissipated from the main power supply 10a.

The battery pack 11 not experiencing thermal runaway in the main power supply 10a and/or the on-board low-voltage power supply 20a are controlled to supply power to the heat-dissipation unit 30 when the battery pack 11 in the main power supply 10a experiences thermal runaway, so that the heat-dissipation unit 30 dissipates heat from the main power supply 10a.

Specifically, the on-board low-voltage power supply 20a is controlled to supply power to the second heat-dissipation unit 32 when the battery pack 11 in the main power supply 10a experiences thermal runaway, so that the second heat-dissipation unit 32 dissipates heat from the main power supply 10a.

In order to select the appropriate heat-dissipation unit 30 for heat dissipation according to the severity of thermal runaway of the battery pack 11, specifically, the second heat-dissipation unit 32 includes a first subunit 321 and a second subunit 322.

The on-board low-voltage power supply 20a is controlled to supply power to the second heat-dissipation unit 32 when the battery pack 11 in the main power supply 10a experiences thermal runaway, so that the second heat-dissipation unit 32 dissipates heat from the main power supply 10a.

Specifically, numerical values of multiple indicators reflecting the degree of thermal runaway of the battery pack 11 are obtained.

If the numerical values of the obtained indicators satisfy a preset condition, the on-board low-voltage power supply 20a is controlled to supply power to the first subunit 321, so that the first subunit 321 dissipates heat from the main power supply 10a.

If the numerical values of the obtained indicators do not satisfy the preset condition, the on-board low-voltage power supply 20a is controlled to supply power to the second subunit 322, so that the second subunit 322 dissipates heat from the main power supply 10a.

From the perspective of heat dissipation effect, the heat dissipation effect of the first subunit 321 is lower than the heat dissipation effect of the second subunit 322. If the battery pack 11 in the first power supply device 10 experiences thermal runaway, an alternative manner is adopted to select an appropriate subunit to dissipate heat from the battery pack 11 in the first power supply device 10 according to the degree of thermal runaway.

In addition to adopting the alternative manner to dissipate heat from the battery pack 11 in the first power supply device 10, heat may also be dissipated from the battery pack 11 in the first power supply device 10 by adopting a superimposing form. Specifically, in some embodiments, the second heat-dissipation unit 32 includes the first subunit 321 and the second subunit 322.

The low-voltage power supply is controlled to supply power to the second heat-dissipation unit 32 when the battery pack 11 in the main power supply 10a experiences thermal runaway, and the second heat-dissipation unit 32 is controlled to dissipate heat from the main power supply 10a.

Specifically, the numerical values of the indicators reflecting the degree of thermal runaway of the battery pack 11 are obtained.

If the numerical values of the obtained indicators satisfy the preset condition, the on-board low-voltage power supply 20a is controlled to supply power to the first subunit 321, and the first subunit 321 is controlled to dissipate heat from the main power supply 10a.

If the numerical values of the obtained indicators do not satisfy the preset condition, the on-board low-voltage power supply 20a is controlled to supply power to the first subunit 321 and the second subunit 322, so that the first subunit 321 and the second subunit 322 dissipate heat from the main power supply 10a.

In this way, when thermal runaway of the battery pack 11 is more severe, the heat dissipation effect is enhanced through the superposition of the two subunits, which may effectively prevent thermal runaway from further deterioration.

In other embodiments, the second heat-dissipation unit 32 includes a heat exchanger and the first subunit 321 disposed on a hot side of the heat exchanger and the second subunit 322 disposed on a cold side of the heat exchanger.

The low-voltage power supply is controlled to supply power to the second heat-dissipation unit 32 when the battery pack 11 in the main power supply 10a experiences thermal runaway, and the second heat-dissipation unit 32 is controlled to dissipate heat from the main power supply 10a.

Specifically, the numerical values of the indicators reflecting the degree of thermal runaway of the battery pack 11 are obtained.

If the numerical values of the obtained indicators satisfy the preset condition, the on-board low-voltage power supply 20a is controlled to supply power to a first liquid-cooling circuit of the first subunit 321, so that a coolant dissipates heat from the main power supply 10a via the first liquid-cooling circuit.

If the numerical values of the obtained indicators do not satisfy the preset condition, the on-board low-voltage power supply 20a is controlled to supply power to the first liquid-cooling circuit of the first subunit 321, so that the coolant dissipates heat from the main power supply 10a via the first liquid-cooling circuit; and the on-board low-voltage power supply 20a is controlled to supply power to a heat-dissipation circuit of the second subunit 322, so that a cooling medium in the heat-dissipation circuit exchanges heat with the coolant in the first liquid-cooling circuit in the heat exchanger.

Specifically, the first subunit 321 and the second subunit 322 are respectively disposed on the hot side and the cold side of the heat exchanger. The first subunit 321 specifically dissipates heat from the battery pack 11 through continuously circulating the coolant in the first liquid-cooling circuit. After the temperature of the coolant in the first subunit 321 increases, the coolant exchanges heat with the cooling medium in the second subunit 322 in the heat exchanger. A cooling source of the cooling medium in the second subunit 322 is a natural cooling source such as air.

During specific implementation, the higher the numerical values of the obtained indicators, the more serious the degree of thermal runaway of the battery pack. The indicators include but are not limited to the temperature of the battery pack, the air pressure in the battery pack, etc. The "preset condition" may be set such that the numerical values of the obtained indicators are all less than a corresponding threshold.

In the control method, the indicators reflecting the degree of thermal runaway of the battery pack 11 include at least the temperature in the battery pack 11 and the number of unit modules experiencing thermal runaway in the battery pack 11. Each unit module includes at least one single battery.

The temperature in the battery pack 11 refers to the ambient temperature in the box of the battery pack 11. The higher the temperature of the battery pack 11, the more heat is released by the unit module experiencing thermal runaway. After a large amount of heat accumulates inside the battery pack 11, the energy threshold triggering thermal runaway of adjacent unit modules may be easily reached, thereby causing thermal runaway of other unit modules, and further spreading thermal runaway.

The battery pack 11 includes multiple unit modules. The greater the number of unit modules experiencing thermal runaway, the more heat is released, and the more easily it is to further cause thermal runaway of adjacent unit modules, thereby causing the degree of thermal runaway of the battery pack 11 to further deteriorate.

In addition to the temperature of the battery pack 11 and the number of unit modules experiencing thermal runaway in the battery pack 11, the indicators reflecting the degree of thermal runaway of the battery pack 11 may further include but are not limited to the air pressure in the battery pack 11, the concentration of smoke in the battery pack 11, the discharge amount of electrolyte, the degree of expansion of the battery, and other indicators.

In the embodiment, the two indicators, the temperature of the battery pack 11 and the number of unit modules experiencing thermal runaway in the battery pack 11, are taken as examples for specific description.

Figure 7:
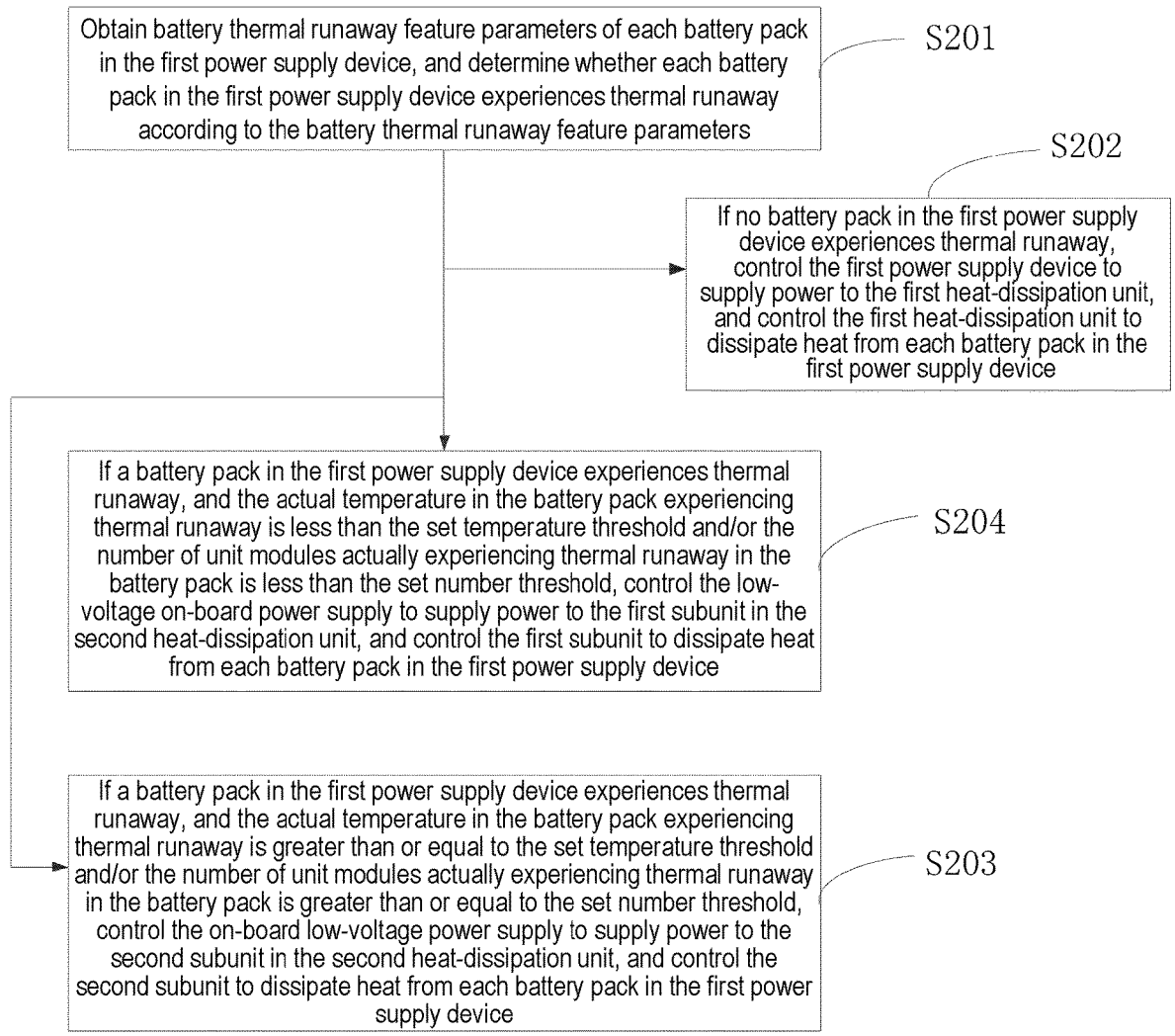
FIG. 7 is a flowchart of the control method according to an embodiment of the disclosure.

Specifically, a temperature threshold is set for the temperature in the battery pack 11, and a number threshold is set for the number of unit modules experiencing thermal runaway in the battery pack 11. As shown in FIG. 7, the control method specifically includes the following steps.

In Step S201, battery thermal runaway feature parameters of each battery pack 11 in the first power supply device 10 are obtained. Whether each battery pack 11 in the first power supply device 10 experiences thermal runaway is determined according to the battery thermal runaway feature parameters.

In Step S202, if no battery pack 11 in the first power supply device 10 experiences thermal runaway, the first power supply device 10 is controlled to supply power to the first heat-dissipation unit 31, and the first heat-dissipation unit 31 is controlled to dissipate heat from each battery pack 11 in the first power supply device 10.

In Step S203, if the battery pack 11 in the first power supply device 10 experiences thermal runaway, and the actual temperature in the battery pack 11 experiencing thermal runaway is greater than or equal to the set temperature threshold and/or the number of unit modules actually experiencing thermal runaway in the battery pack 11 is greater than or equal to the set number threshold, the on-board low-voltage power supply 20*a* is controlled to supply power to the second subunit 322 in the second heat-dissipation unit 32, and the second subunit 322 is controlled to dissipate heat from each battery pack 11 in the first power supply device 10.

In Step S204, if the battery pack 11 in the first power supply device 10 experiences thermal runaway, and the actual temperature in the battery pack 11 experiencing thermal runaway is less than the set temperature threshold and/or the number of unit modules actually experiencing thermal runaway in the battery pack 11 is less than the set number threshold, the low-voltage on-board power supply 20*a* is controlled to supply power to the first subunit 321 in the second heat-dissipation unit 32, and the first subunit 321 is controlled to dissipate heat from each battery pack 11 in the first power supply device 10.

Optionally, a temperature value in the battery pack 11 is specifically detected through the following manner.

Temperature values at at least two different positions in the battery pack 11 are obtained.

An average value of the at least two temperature values is used as the temperature value in the battery pack 11.

During specific implementation, multiple temperature collection devices may be disposed at different positions in the battery pack 11. Each temperature collection device is configured to collect the temperature at the corresponding position in the battery pack 11. The average value of the temperature values collected through the temperature collection devices is used as a physical quantity measuring the degree of thermal runaway of the battery pack 11, so that the accuracy is higher and errors caused by a single temperature collection device are avoided.

Optionally, the number threshold of the number of unit modules experiencing thermal runaway in the battery pack 11 is set as two.

In Step S203, specifically, if the battery pack 11 in the first power supply device 10 experiences thermal runaway, and when the actual temperature in the battery pack 11 experiencing thermal runaway is greater than or equal to the set temperature threshold and/or at least two unit modules in the battery pack 11 experience thermal runaway, the on-board low-voltage power supply 20*a* is controlled to supply power to the second subunit 322 in the second heat-dissipation unit 32, and the second subunit 322 is controlled to dissipate heat from each battery pack 11 in the first power supply device 10.

In Step S204, specifically, if there the battery pack 11 in the first power supply device 10 experiences thermal runaway, and the actual temperature in the battery pack 11 experiencing thermal runaway is less than the set temperature threshold and/or only one unit module in the battery pack 11 experiences thermal runaway, the on-board low-voltage power supply 20*a* is controlled to supply power to the first subunit 321, and the first subunit 321 in the second heat-dissipation unit 32 is controlled to dissipate heat from each battery pack 11 in the first power supply device 10.

The number threshold of the unit modules experiencing thermal runaway in the battery pack 11 may also be set as three, four, and other numbers, which will not be described in detail here.

Figure 8:
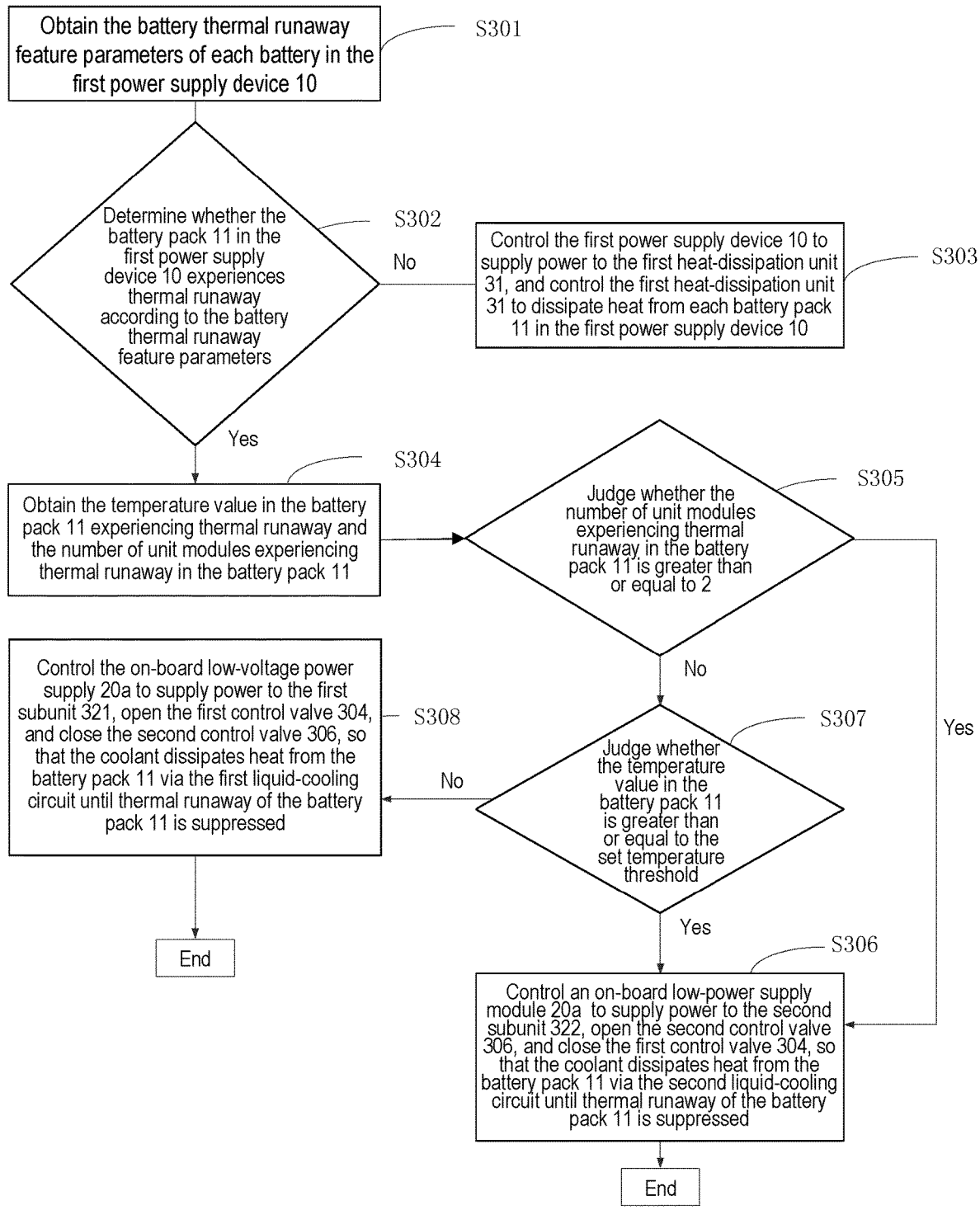
FIG. 8 is a specific flowchart of the control method according to the embodiment of the disclosure.

In the embodiment, in conjunction with the principle diagram of the structure of the second heat-dissipation unit 32 shown in FIG. 4, a specific flowchart of the control method is shown in FIG. 8, which includes the following steps.

In Step S301, the battery thermal runaway feature parameters of each battery in the first power supply device 10 are obtained.

In Step S302, whether the battery pack 11 in the first power supply device 10 experiences thermal runaway is determined according to the battery thermal runaway feature parameters. If yes, Step S304 is executed. If not, the execution of Step S303 ends.

In Step S303, the first power supply device 10 is controlled to supply power to the first heat-dissipation unit 31, and the first heat-dissipation unit 31 is controlled to dissipate heat from each battery pack 11 in the first power supply device 10.

In Step S304, the temperature value in the battery pack 11 experiencing thermal runaway and the number of unit modules experiencing thermal runaway in the battery pack 11 are obtained.

In Step S305, whether the number of unit modules experiencing thermal runaway in the battery pack 11 is greater than or equal to 2 is judged. If yes, Step S306 is executed. If not, Step S307 is executed.

In Step S306, an on-board low-voltage power supply module 20a is controlled to supply power to the second subunit 322, the second control valve 306 is opened, and the first control valve 304 is closed, so that the coolant dissipates heat from the battery pack 11 via the second liquid-cooling circuit until thermal runaway of the battery pack 11 is suppressed, and the end.

In Step S307, whether the temperature value in the battery pack 11 is greater than or equal to the set temperature threshold is judged. If yes, Step S306 is executed. If not, Step S308 is executed.

In Step S308, the on-board low-voltage power supply 20a is controlled to supply power to the first subunit 321, the first control valve 304 is opened, and the second control valve 306 is closed, so that the coolant dissipates heat from the battery pack 11 via the first liquid-cooling circuit until thermal runaway of the battery pack 11 is suppressed, and the end.

In the control method, when the two indicators, the temperature in the battery pack 11 and the number of unit modules experiencing thermal runaway in the battery pack 11, are adopted to reflect the degree of thermal runaway in the battery pack 11, the calibration method of the temperature threshold in the battery pack 11 is specifically as follows.

A state of charge of the battery pack 11 is adjusted to an upper limit.

The battery pack 11 is placed in environments with different initial temperatures. A set number of unit modules is selected to perform a thermal runaway test.

After the set number of unit modules experience thermal runaway, the first subunit 321 is adopted to dissipate heat from the battery pack 11 to obtain the upper limit of the initial temperature that can suppress thermal runaway of the entire pack.

The upper limit is defined as the temperature threshold in the battery pack 11.

Specifically, firstly, before the test, the battery pack 11 is in a fully charged state.

Secondly, the battery pack 11 is placed in test environments with different initial temperatures. For example, the battery pack 11 is respectively placed in test environments at 25° C., 30° C., 35° C., 40° C., etc. Optionally, the initial temperatures of the test environments progressively increase with a certain gradient value.

Then, the set number of unit modules is selected to perform the thermal runaway test, and the first subunit 321 is adopted to dissipate heat from the battery pack 11. For example, in the test environment with the initial temperature of 25° C., after the set number of unit modules experience thermal runaway, if the first subunit 321 is adopted, thermal runaway of the battery pack 11 may be suppressed. Then, the test environment with a higher initial temperature is selected for the test until in the test environment with a certain initial temperature, adopting the first subunit 321 may suppress thermal runaway of the battery pack 11, but in another test environment with an initial temperature higher than the initial temperature, adopting the first subunit 321 cannot suppress thermal runaway. This initial temperature is calibrated as the temperature threshold in the battery pack 11.

"The first subunit 321 may suppress thermal runaway of the battery pack 11" refers to that under the action of the first subunit 321, other unit modules in the battery pack 11 will not experience thermal runaway and/or the battery pack 11 will not explode, catch fire, etc.

Figure 9:
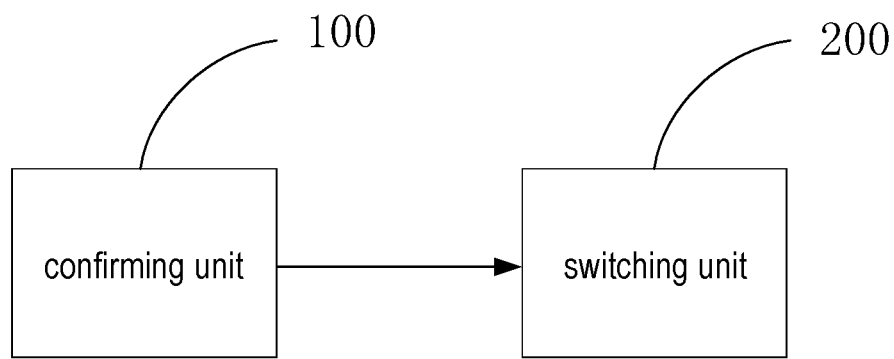
FIG. 9 is a schematic diagram of a structure of a control device according to an embodiment of the disclosure.

Based on the same inventive concept, an embodiment of the disclosure further provides a control device of a power supply system. The power supply system includes a first power supply device 10, a heat-dissipation unit 30, and a second power supply device 20. The first power supply device 10 includes one or more battery packs 11. The heat-dissipation unit 30 is configured to dissipate heat from the first power supply device 10. As shown in FIG. 9, the control device includes the following.

A confirming unit 100 is configured to confirm whether each battery pack 11 in the first power supply device 10 experiences thermal runaway.

A switching unit 200 is configured to control the first power supply device 10 to supply power to the heat-dissipation unit 30 when no battery pack 11 in the first power supply device 10 experiences thermal runaway, so that the heat-dissipation unit 30 dissipates heat from the first power supply device 10; and control the battery pack 11 not experiencing thermal runaway in the first power supply device 10 and/or the second power supply device 20 to supply power to the heat-dissipation unit 30 when the battery pack 11 in the first power supply device 10 experiences thermal runaway, so that the heat-dissipation unit 30 dissipates heat from the first power supply device 10.

In some embodiments, the power supply system is applied to a vehicle. The first power supply device 10 is a main power supply 10a of the vehicle. The second power supply device 20 is another power supply other than the main power supply 10a of the vehicle.

The switching unit 100 is specifically configured to control the main power supply 10a to supply power to the heat-dissipation unit 30 when no battery pack 11 in the main power supply 10a experiences thermal runaway, so that the heat-dissipation unit 30 refrigerates and dissipates heat from the main power supply 10a; and control the battery pack 11 not experiencing thermal runaway in the main power supply 10a and/or another power supply other than the main power supply 10a to supply power to the heat-dissipation unit 30 when the battery pack 11 in the main power supply 10a experiences thermal runaway, so that the heat-dissipation unit 30 dissipates heat from the main power supply 10a.

In some embodiments, another power supply other than the main power supply 10a of the vehicle is the on-board low-voltage power supply 20a, which includes the following.

The switching unit 100 is specifically configured to control the battery pack 11 not experiencing thermal runaway in the main power supply 10a and/or the on-board low-voltage power supply 20a to supply power to the heat-dissipation unit 30 when the battery pack 11 in the main power supply 10a experiences thermal runaway, so that the heat-dissipation unit 30 dissipates heat from the main power supply 10a.

The description of the above method embodiment is also applicable to the control device according to the embodiment of the disclosure. In other words, the control principle and specific implementation of the control device are the same as the principle and implementation of the control method in the above embodiment. Therefore, the control method of the control device may be implemented with reference to the specific implementation in the above embodiment, which will not be repeated here.

In the power supply system and the control method and the control device of the power supply system provided by the embodiments of the disclosure, the first power supply device may be adopted to supply power to the electrical components in the heat-dissipation unit when no battery pack in the first power supply device experiences thermal runaway, thereby implementing heat dissipation. The second power supply device may be adopted to supply power to the electrical components in the heat-dissipation unit when the battery pack in the first power supply device experiences thermal runaway, thereby implementing heat dissipation. The second power supply device is another power supply device different from the first power supply device. Supplying power to the electrical components in the heat-dissipation unit through the second power supply device avoids safety hazards caused by continuous discharge of the battery pack experiencing thermal runaway.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

The disclosure provides a power supply system and a control method and a control device of the power supply system, which are configured to solve safety issues when a battery pack experiences thermal runaway in the prior art.

The technical solutions above have the following beneficial effects.

During the usage process of the power supply system provided by the embodiments of the disclosure, when no battery pack in the first power supply device experiences thermal runaway, the first power supply device is adopted to supply power to the heat-dissipation unit, thereby implementing heat dissipation; and when the first power supply device has a battery pack experiencing thermal runaway, a battery pack not experiencing thermal runaway in the first power supply device and/or the second power supply device are adopted to supply power to the heat-dissipation unit, thereby implementing heat dissipation. The second power supply device is another power supply device different from the first power supply device. As such, on the one hand, the heat dissipation issue of the battery pack is solved. On the other hand, safety hazards caused by a battery pack that has experienced thermal runaway continuing to supply power are avoided.

What is claimed is:

1. A power supply apparatus, comprising:
a first power supply device, comprising one or more battery packs;
a heat-dissipation unit, configured to dissipate heat from the first power supply device;
a second power supply device comprising an on-board low-voltage power supply; and
a control device, configured to confirm whether each battery pack in the first power supply device experiences thermal runaway, and control the first power supply device to supply power to the heat-dissipation unit when no battery pack in the first power supply device experiences thermal runaway, so that the heat-dissipation unit dissipates heat from the first power supply device; and control a battery pack not experiencing thermal runaway in the first power supply device and/or the second power supply device to supply power to the heat-dissipation unit when a battery pack in the first power supply device experiences thermal runaway, so that the heat-dissipation unit dissipates heat from the first power supply device; and wherein the power supply apparatus further comprises a first thermal runaway detection device, wherein the first thermal runaway detection device is configured to detect a plurality of indicators reflecting a degree of thermal runaway of the battery pack, and send numerical values of the indicators reflecting the degree of thermal runaway of the battery pack to the control device; wherein the heat-dissipation unit comprises a first heat-dissipation unit and a second heat-dissipation unit;

the second heat-dissipation unit comprises a first subunit and a second subunit, and a heat dissipation effect of the first subunit is lower than a heat dissipation effect of the second subunit, wherein the control device is configured to control the on-board low-voltage power supply to supply power to the second heat-dissipation unit when a battery pack in the main power supply experiences thermal runaway, so that the second heat-dissipation unit dissipates heat from the main power supply, specifically:

the control device obtains the numerical values of the indicators reflecting the degree of thermal runaway of the battery pack; the control device controls the on-board low-voltage power supply to supply power to the first subunit when the numerical values of the indicators satisfy a preset condition, so that the first subunit dissipates heat from the main power supply; and the control device controls the on-board low-voltage power supply to supply power to the second subunit when the numerical values of the indicators do not satisfy the preset condition, so that the second subunit dissipates heat from the main power supply.

2. The power supply apparatus according to claim 1, wherein the power supply apparatus is applied to a vehicle;
the first power supply device is a main power supply of the vehicle; and
the second power supply device is another power supply other than the main power supply of the vehicle.

3. The power supply apparatus according to claim 2, wherein the second power supply device is the on-board low-voltage power supply of the vehicle.

4. The power supply apparatus according to claim 3, wherein
the control device is configured to control the first power supply device to supply power to the heat-dissipation unit when no battery pack in the first power supply device experiences thermal runaway, so that the heat-dissipation unit dissipates heat from the first power supply device, specifically:
the control device is configured to control the main power supply to supply power to the first heat-dissipation unit when no battery pack in the main power supply experiences thermal runaway, so that the first heat-dissipation unit refrigerates and dissipates heat from the main power supply; and
the control device is configured to control the battery pack not experiencing thermal runaway in the first power supply device and/or the second power supply device to supply power to the heat-dissipation unit when a battery pack in the first power supply device experiences thermal runaway, so that the heat-dissipation unit dissipates heat from the first power supply device, specifically:

the control device is configured to control the on-board low-voltage power supply to supply power to the second heat-dissipation unit when a battery pack in the main power supply experiences thermal runaway, so that the second heat-dissipation unit dissipates heat from the main power supply.

5. The power supply apparatus according to claim 1, wherein the control device controls the on-board low-voltage power supply to supply power to the first subunit when the numerical values of the indicators satisfy the preset condition, so that the first subunit dissipates heat from the main power supply, specifically:
the control device controls the on-board low-voltage power supply to supply power to a first liquid-cooling circuit of the first subunit when the numerical values of the indicators satisfy the preset condition, so that a coolant dissipates heat from the main power battery via the first liquid-cooling circuit; and
the control device controls the on-board low-voltage power supply to supply power to the second subunit when the numerical values of the indicators do not satisfy the preset condition, so that the second subunit dissipates heat from the main power supply, specifically:
the control device controls the on-board low-voltage power supply to supply power to a second liquid-cooling circuit of the second subunit when the numerical values of the indicators do not satisfy the preset condition, so that a coolant dissipates heat from the main power supply via the second liquid-cooling circuit; and controls the on-board low-voltage power supply to supply power to an air-cooling radiator of the second subunit, so that the air-cooling radiator dissipates heat from the coolant in the second liquid-cooling circuit.

6. The power supply apparatus according to claim 5, wherein the indicators reflecting the degree of thermal runaway of the battery pack at least comprise a temperature value in the battery pack and a number of unit modules experiencing thermal runaway in the battery pack, wherein the unit module comprises at least one single battery.

7. The power supply apparatus according to claim 6, wherein the first thermal runaway detection device specifically detects the temperature value in the battery pack through a following manner:
the first thermal runaway detection device obtains temperature values at at least two different positions in the battery pack; and
an average value of at least two of the temperature values is used as the temperature value in the battery pack.

8. The power supply apparatus according to claim 1, wherein the indicators reflecting the degree of thermal runaway of the battery pack at least comprise a temperature value in the battery pack and a number of unit modules experiencing thermal runaway in the battery pack, wherein the unit module comprises at least one single battery.

9. The power supply apparatus according to claim 8, wherein the first thermal runaway detection device specifically detects the temperature value in the battery pack through a following manner:
the first thermal runaway detection device obtains temperature values at at least two different positions in the battery pack; and
an average value of at least two of the temperature values is used as the temperature value in the battery pack.

10. The power supply apparatus according to claim 4, further comprising a first thermal runaway detection device, wherein the first thermal runaway detection device is configured to detect a plurality of indicators reflecting a degree of thermal runaway of the battery pack, and send numerical values of the indicators reflecting the degree of thermal runaway of the battery pack to the control device;
the second heat-dissipation unit comprises a first subunit and a second subunit, wherein
the control device is configured to control the on-board low-voltage power supply to supply power to the second heat-dissipation unit when a battery pack in the main power supply experiences thermal runaway, and control the second heat-dissipation unit to dissipate heat from the main power supply, specifically:
the control device obtains the numerical values of the indicators reflecting the degree of thermal runaway of the battery pack;
the control device controls the on-board low-voltage power supply to supply power to the first subunit when the numerical values of the indicators satisfy a preset condition, and controls the first subunit to dissipate heat from the main power supply; and
the control device controls the on-board low-voltage power supply to supply power to the first subunit and the second subunit when the numerical values of the indicators do not satisfy the preset condition, so that the first subunit and the second subunit dissipate heat from the main power supply.

11. The power supply apparatus according to claim 10, wherein the indicators reflecting the degree of thermal runaway of the battery pack at least comprise a temperature value in the battery pack and a number of unit modules experiencing thermal runaway in the battery pack, wherein the unit module comprises at least one single battery.

12. The power supply apparatus according to claim 11, wherein the first thermal runaway detection device specifically detects the temperature value in the battery pack through a following manner:
the first thermal runaway detection device obtains temperature values at at least two different positions in the battery pack; and
an average value of at least two of the temperature values is used as the temperature value in the battery pack.

13. The power supply apparatus according to claim 4, further comprising a first thermal runaway detection device, wherein the first thermal runaway detection device is configured to detect a plurality of indicators reflecting a degree of thermal runaway of the battery pack, and send numerical values of the indicators reflecting the degree of thermal runaway of the battery pack to the control device;
the second heat-dissipation unit comprises a heat exchanger and a first subunit disposed on a hot side of the heat exchanger and a second subunit disposed on a cold side of the heat exchanger, wherein
the control device is configured to control the on-board low-voltage power supply to supply power to the second heat-dissipation unit when a battery pack in the main power supply experiences thermal runaway, so that the second heat-dissipation unit dissipates heat from the main power supply, specifically:
the control device obtains the numerical values of the indicators reflecting the degree of thermal runaway of the battery pack;
the control device controls the on-board low-voltage power supply to supply power to a first liquid-cooling circuit of the first subunit when the numerical values of the indicators satisfy a preset condition, so that the first liquid-cooling circuit dissipates heat from the main power supply; and the control device controls the on-board low-voltage power supply to supply power to the first liquid-cooling circuit of the first subunit when the numerical values of the indicators do not satisfy the preset condition, so that the first liquid-cooling circuit dissipates heat from the main power supply; and controls the on-board low-voltage power supply to supply power to a heat-dissipation circuit of the second subunit, so that a refrigerant in the heat-dissipation circuit exchanges heat with a coolant in the first liquid-cooling circuit in the heat exchanger.

14. The power supply apparatus according to claim 13, wherein the indicators reflecting the degree of thermal runaway of the battery pack at least comprise a temperature value in the battery pack and a number of unit modules experiencing thermal runaway in the battery pack, wherein the unit module comprises at least one single battery.

15. The power supply apparatus according to claim 14, wherein the first thermal runaway detection device specifically detects the temperature value in the battery pack through a following manner:
the first thermal runaway detection device obtains temperature values at at least two different positions in the battery pack; and
an average value of at least two of the temperature values is used as the temperature value in the battery pack.

16. The power supply apparatus according to claim 4, wherein a plurality of indicators reflecting a degree of thermal runaway of the battery pack at least comprise a temperature value in the battery pack and a number of unit modules experiencing thermal runaway in the battery pack, wherein the unit module comprises at least one single battery.

17. The power supply apparatus according to claim 16, wherein the first thermal runaway detection device specifically detects the temperature value in the battery pack through a following manner:
the first thermal runaway detection device obtains temperature values at at least two different positions in the battery pack; and
an average value of at least two of the temperature values is used as the temperature value in the battery pack.

18. A control method of a power supply apparatus, wherein the power supply system comprises a first power supply device, a heat-dissipation unit, and a second power supply device comprising an on-board low-voltage power supply, the first power supply device comprises one or more battery packs, and the heat-dissipation unit is configured to dissipate heat from the first power supply device, the control method comprising:
confirming whether each battery pack in the first power supply device experiences thermal runaway;
controlling the first power supply device to supply power to the heat-dissipation unit when no battery pack in the first power supply device experiences thermal runaway, so that the heat-dissipation unit dissipates heat from the first power supply device; and
controlling the battery pack not experiencing thermal runaway in the first power supply device and/or the second power supply device to supply power to the heat-dissipation unit when a battery pack in the first power supply device experiences thermal runaway, so that the heat-dissipation unit dissipates heat from the first power supply device; and wherein the power supply apparatus further comprises a first thermal runaway detection device, wherein the first thermal runaway detection device is configured to detect a plurality of indicators reflecting a degree of thermal runaway of the battery pack, and send numerical values of the indicators reflecting the degree of thermal runaway of the battery pack to the control device; wherein the heat-dissipation unit comprises a first heat-dissipation unit and a second heat-dissipation unit;

the second heat-dissipation unit comprises a first subunit and a second subunit, and a heat dissipation effect of the first subunit is lower than a heat dissipation effect of the second subunit, wherein the control device is configured to control the on-board low-voltage power supply to supply power to the second heat-dissipation unit when a battery pack in the main power supply experiences thermal runaway, so that the second heat-dissipation unit dissipates heat from the main power supply, specifically:

the control device obtains the numerical values of the indicators reflecting the degree of thermal runaway of the battery pack; the control device controls the on-board low-voltage power supply to supply power to the first subunit when the numerical values of the indicators satisfy a preset condition, so that the first subunit dissipates heat from the main power supply; and the control device controls the on-board low-voltage power supply to supply power to the second subunit when the numerical values of the indicators do not satisfy the preset condition, so that the second subunit dissipates heat from the main power supply.

19. A control device of a power supply apparatus, wherein the power supply system comprises a first power supply device, a heat-dissipation unit, and a second power supply device comprising an on-board low-voltage power supply, the first power supply device comprises one or more battery packs, and the heat-dissipation unit is configured to dissipate heat from the first power supply device, the control device comprising:
a confirming unit, configured to confirm whether each battery pack in the first power supply device experiences thermal runaway; and
a switching unit, configured to control the first power supply device to supply power to the heat-dissipation unit when no battery pack in the first power supply device experiences thermal runaway, so that the heat-dissipation unit dissipates heat from the first power supply device; and control a battery pack not experiencing thermal runaway in the first power supply device and/or the second power supply device to supply power to the heat-dissipation unit when a battery pack in the first power supply device experiences thermal runaway, so that the heat-dissipation unit dissipates heat from the first power supply device; and wherein the power supply apparatus further comprises a first thermal runaway detection device, wherein the first thermal runaway detection device is configured to detect a plurality of indicators reflecting a degree of thermal runaway of the battery pack, and send numerical values of the indicators reflecting the degree of thermal runaway of the battery pack to the control device; wherein the heat-dissipation unit comprises a first heat-dissipation unit and a second heat-dissipation unit;

the second heat-dissipation unit comprises a first subunit and a second subunit, and a heat dissipation effect of the first subunit is lower than a heat dissipation effect of the second subunit, wherein the control device is configured to control the on-board low-voltage power supply to supply power to the second heat-dissipation unit when a battery pack in the main power supply experiences thermal runaway, so that the second heat-dissipation unit dissipates heat from the main power supply, specifically:

the control device obtains the numerical values of the indicators reflecting the degree of thermal runaway of the battery pack; the control device controls the on-board low-voltage power supply to supply power to the first subunit when the numerical values of the indicators satisfy a preset condition, so that the first subunit dissipates heat from the main power supply; and the control device controls the on-board low-voltage power supply to supply power to the second subunit when the numerical values of the indicators do not satisfy the preset condition, so that the second subunit dissipates heat from the main power supply.

* * * * *